United States Patent
Eizenberg

(10) Patent No.: US 12,242,914 B2
(45) Date of Patent: Mar. 4, 2025

(54) INDOOR TAG LOCATION DETECTION SYSTEM

(71) Applicant: Kontakt.io Inc., New York, NY (US)

(72) Inventor: Rom Eizenberg, New York, NY (US)

(73) Assignee: Kontakt.io Inc., New York, NY (US)

( * ) Notice: Subject to any disclaimer, the term of this patent is extended or adjusted under 35 U.S.C. 154(b) by 545 days.

(21) Appl. No.: 17/553,639

(22) Filed: Dec. 16, 2021

(65) Prior Publication Data

US 2022/0196786 A1    Jun. 23, 2022

Related U.S. Application Data

(60) Provisional application No. 63/126,899, filed on Dec. 17, 2020.

(51) Int. Cl.
*G06K 7/10* (2006.01)
*G01S 5/02* (2010.01)
*G06K 19/07* (2006.01)

(52) U.S. Cl.
CPC ...... *G06K 7/10366* (2013.01); *G01S 5/02526* (2020.05); *G01S 5/02585* (2020.05); *G01S 5/0284* (2013.01); *G06K 19/0723* (2013.01)

(58) Field of Classification Search
CPC .......... G06N 7/01; G06N 3/063; G06N 3/047; H04W 4/029; H04W 12/009; H04W 4/38; H04W 84/18; G05B 19/048
See application file for complete search history.

(56) References Cited

U.S. PATENT DOCUMENTS

| | | |
|---|---|---|
| 5,712,869 A | 1/1998 | Lee et al. |
| 10,008,875 B1 | 6/2018 | Leabman |
| 10,015,756 B1 | 7/2018 | Bullington et al. |
| 2009/0231136 A1 | 9/2009 | Sugla et al. |
| 2011/0211563 A1 | 9/2011 | Herrala et al. |
| 2016/0040902 A1 | 2/2016 | Shah |
| 2018/0341817 A1 | 11/2018 | Steffanson et al. |
| 2019/0066464 A1* | 2/2019 | Wedig .................. G08B 27/001 |
| 2020/0021454 A1* | 1/2020 | Pandharipande ..... H04W 24/08 |
| 2020/0064784 A1 | 2/2020 | Steiner |

FOREIGN PATENT DOCUMENTS

EP    1993065 A1    11/2008

OTHER PUBLICATIONS

PCT International Search Report and Written Opinion, PCT Application No. PCT/IB2021/061890, Mar. 28, 2022, 12 pages.
United States Office Action, U.S. Appl. No. 17/553,634, filed Jun. 5, 2024, 17 pages.

* cited by examiner

*Primary Examiner* — Khalid W Shaheed
(74) *Attorney, Agent, or Firm* — Fenwick & West LLP

(57) ABSTRACT

A method for locating wireless tags is described. For each room of a plurality of rooms, occupancy data of the room is received from an occupancy sensor in the room. Location data of one or more wireless tags is received. The location data of each wireless tag indicates one or more probabilities that the wireless tag is in at least some of the plurality of rooms. It is determined, based on the location data and the occupancy data, which room of the plurality of rooms each wireless tag of the one or more wireless tags is located in.

18 Claims, 19 Drawing Sheets

INDOOR TAG LOCATION DETECTION SYSTEM

CROSS-REFERENCE TO RELATED APPLICATIONS

This application claims priority to U.S. Provisional Application No. 63/126,899 filed Dec. 17, 2020 which is incorporated by reference.

FIELD

The present disclosure relates generally to a system for location a wireless tag, and more particularly, to detecting room occupancy using the location of the wireless tag.

BACKGROUND

Internet of Things (IoT) devices and the IoT services that rely on those devices can provide numerous benefits, for example, the creation of "smart" homes, office spaces, and medical facilities.

Tracking the location of objects (such as equipment and people) as they move through a building or other space (herein, "object location tracking") can enable many IoT services, for example, device network management, monitoring, location alerts, asset management, workflow outcome predictions, and understanding utilization patterns of spaces. However, the practical application of these services correlates with the accuracy and reliability of the localization system providing the object location tracking, which in turn is based on the quality of the infrastructure for object location tracking in the space. Many services relying on object location tracking begins to be advantageous when objects can be localized to an individual room (herein, "room resolution localization"). As used herein, a "room" refers to a completely enclosed physical space (fully separated from other rooms by walls) or other designated space within a building (such as a hallway or section of a larger open space). For example, a service that logs access of personnel to sensitive areas of a building is only useful if the object localization system can reliably detect when a user is in a controlled environment (and not in the adjacent bathroom that shares a wall with the controlled environment).

SUMMARY

One approach to object location tracking uses wireless "tags" equipped with low energy radio frequency transmitters such as Bluetooth Low Energy (BLE) radios and a network of access points (with corresponding radio receivers) positioned around the tracked area to receive transmissions from the tags. As the strength of a tag's radio transmission generally decays the further the receiver is from the tag, the distance between the tag and an access point receiving the tag's transmission can be approximated based on the signal strength of the transmission (the Received Signal Strength Indication or RSSI). If a tag's transmission is being picked up by multiple access points, the position of the tag can be estimated using trilateration based on the RSSI data. Using this system, the accuracy of object locations determined using RSSI trilateration is generally a function of the number of radio receivers the tag's signal is received at (and therefore the amount of RSSI data available to be used in the trilateration of the tag's position). Accuracy can also be affected by other factors, such as if the access points are within line of sight of the tags or are receiving a multipath signal (a signal reflected from other objects and thus traveling further than a line of sight signal) or barriers (like doors or walls) between the access point and the tag which may reduce the strength of the signal. However, many spaces in which it would be beneficial to implement object location tracking are not wired to accommodate more than a few access points per floor. This level of infrastructure is reasonable for providing, for example, reliable Wi Fi coverage across the space but is not able to provide sufficiently accurate object location tracking using RSSI techniques only.

Access points, as used herein, are devices that can continuously receive over a low energy radio network (such as a BLE network) and can relay received transmissions (or information about received transitions) to a network-based object tracking system for analysis. Other implementations may be based on ultrawideband or ultrasound wireless technologies instead of or in addition to low energy RF technologies such as BLE. In many cases, adding access points to improve the accuracy of object location tracking can be prohibitively expensive. Access points can require a power connection (as an always-on radio receiver has a constant power draw) and an (often-wired) connection to a LAN or WAN of the space. Therefore, adding an access point to an existing space can require running one or more network or power cables, which makes it difficult to retrofit into existing buildings and spaces not originally designed with that many access points in mind. In some implementations of object location tracking, approximately one access point per room is needed to reliably localize tags to individual rooms using RSSI data, although even this solution can be prone to errors. For example, buildings with high penetrability interior walls (walls which do not greatly attenuate radio signals) can provide additional challenges to room resolution tag localization. In the context of spaces with many small rooms (such as office buildings or hospitals), it can be impractical to add enough access points to achieve room resolution tracking.

In some embodiments, a localization system can improve the accuracy of wireless tag localization using non-access point devices connected with the localization system using a low energy radio network (for example, a BLE network). These "augmented localization devices" (herein, ALDs) can be designed to be easier and/or cheaper to install and maintain than access points (for example, by being battery powered and not requiring any additional cable runs) to improve the accuracy of wireless tag localization in areas of low density of access points (or where the construction of the building is not ideal for RSSI localization). For example, ALDs can include additional sensors (like occupancy sensors which can detect if a room is occupied) that provide additional data that can be used to localize a tag (in this case, a tag associated with a person) to a certain room. Similarly, ALDs can include RF beacons transmitting information about the ALD and/or IR beacons that can transmit unique (or locally unique) room IDs the tags may use to broadcast additional information about their position to the localization system. Some embodiments can use a set of standalone ALDs in addition to access points with ALD functionality built in (gateways).

In some embodiments, the ALD is a device comprising an infrared (IR) transceiver configured to transmit IR signals including a RoomID, a radio frequency (RF) transceiver coupled to an antenna, the RF transceiver configured to emit and receive Bluetooth Low Energy (BLE) signals, a thermal camera configured to determine a heat signature of a room, a sensor array configured to determine characteristics of the room, and a housing holding the IR transceiver, RF transceiver, occupancy sensor, sensor array, and a controller. The controller is configured to determine, from the received BLE signals, a location of BLE-emitting device, determine, from the heat signature, an occupancy of the room comprising positions of occupants of the room, transmit, to an access point, the occupancy of the room.

In some embodiments, a method of location detection of a wireless tag comprises, receiving, by a wireless tag, a signal including a RoomID identifying a room corresponding to a transceiver that generated the signal, wherein the wireless tag receives the signal asynchronously without being synchronized with the transceiver, and broadcasting, by the wireless tag, a tracking packet including the RoomID and an identifier of the wireless tag. The tracking packet is received by an access point, which provides the tracking packet to a localization system that determines a location of the wireless tag based on the RoomID.

In some embodiments, a method of determining the location of one or more wireless tags comprises, for each room of a plurality of rooms receiving occupancy data of a room, determining an occupancy of the room based on the occupancy data of the room, receiving location data of one or more wireless tags, the location data of each wireless tag indicating probabilities that the wireless tag is in at least some of the plurality of rooms, and determining, based on the location data and the occupancy, which room of the plurality of rooms each wireless tag of the one or more wireless tags is located.

In some implementations, the localization system uses ALDs to construct and maintain a set of room fingerprints that can improve the accuracy of the trilateration algorithm. A room fingerprint may reflect the specific qualities of the associated room (for example, taking into account attenuation due to walls between a tag in the room and an access point outside the room) and include a range of expected RSSI values for tags broadcasting from within the fingerprinted room. To gather data for room fingerprinting, ALDs can periodically open a radio receiver and gather RSSI data for the room the ALD is in (as measured from the signals of access points, other ALDs and other static sources of radio signals receivable from inside the room). The resulting room specific RSSI data can be used to train a machine learning model to determine a room fingerprint for that room.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
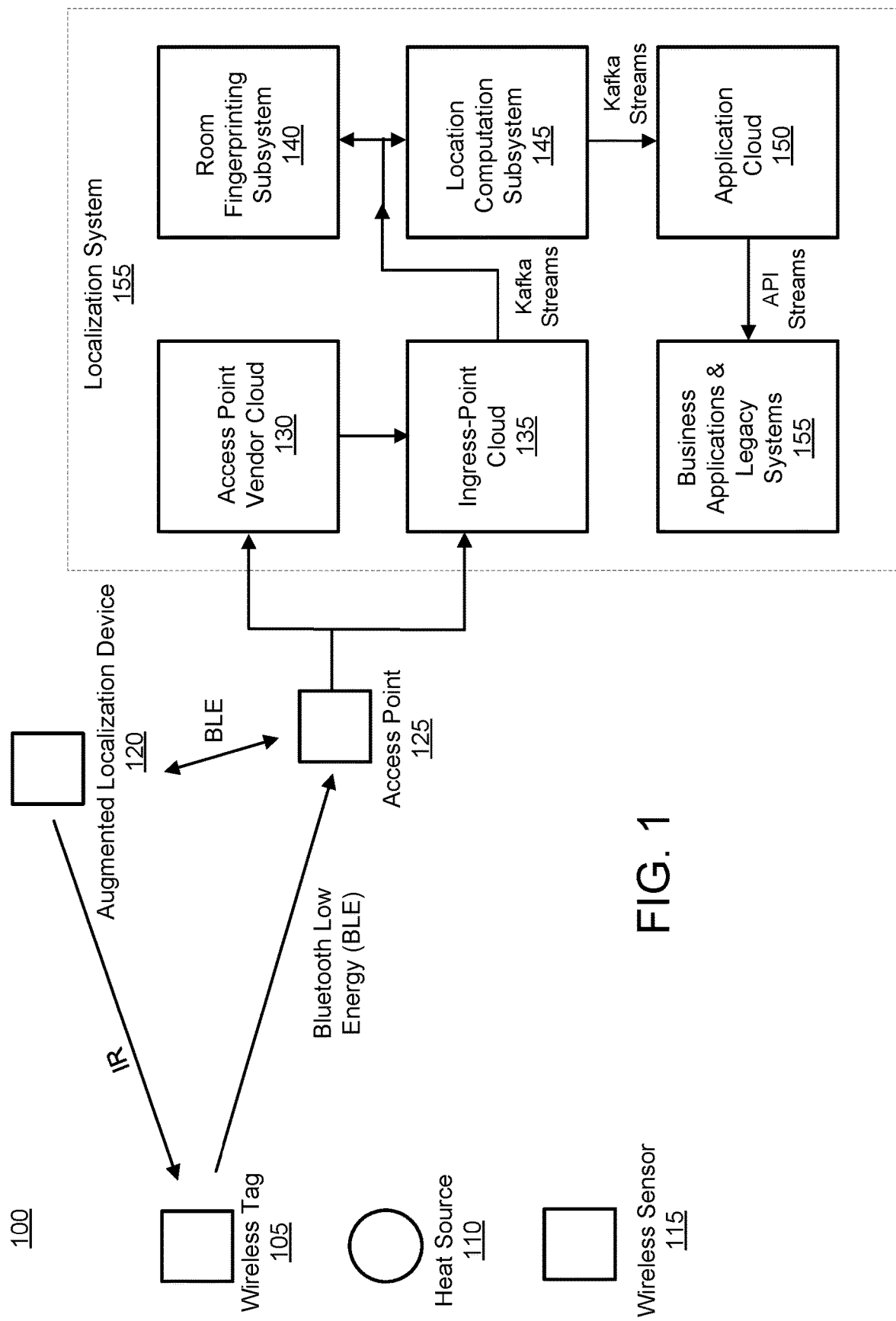
FIG. 1 is a block diagram of an environment in which a localization system operates, in accordance with an embodiment.

FIG. 1 is a block diagram of a system environment 100 in which a localization system 155 operates, in accordance with an embodiment. The system environment 100 depicted in FIG. 1 includes wireless tags 105 (representing an asset or a person to the localization system 155), wireless sensors 115 (such as vibration or $CO_2$ sensors and static wireless or IR beacons), and (in the physical environment) heat sources 110 (such as people) that can be detected by ALDs 120 (Augmented Localization Devices) or the wireless sensors 115.

As described above, the wireless tags 105 can communicate with one or more access points 125 over a Bluetooth Low Energy (BLE) connection (or other low energy wireless connection). Tag 105 communications with an access point 125 can include packets in standardized beacon formats (such as iBeacon® or Eddystone®) and/or additional telemetry or tracking packets specific to the localization system 155 (collectively referred to herein as "tracking packets"). The system environment 100 can also include one or more augmented localization devices 120 ALDs, that can communicate with the access points 125 via BLE (or other low energy wireless connection) and/or wireless tags 105 using an IR (infrared) connection. As described above, an ALD 120 can include sensors and provide functions to improve the accuracy of tag 105 localization.

The access points 125 relay messages received from the wireless tag 105 (and RSSI data for the messages) to the localization system 155 either directly (through a LAN and/or WAN) or, in some implementations, (such as when one or more access points 125 are provided and/or maintained by a third party outside the localizations system) through an intermediate system associated with the access points 125 (labeled the access point vendor cloud 130 in FIG. 1). For example, the access point vendor cloud 130 can receive tracking information through webhooks sent from access points 125 when communications are received from the wireless tags 105. The access point vendor cloud 130 can then forward that information through to the localization system 155 using, for example, a Firehose API stream or other method of continuously providing received tracking information (such as, for example tracking packets, RSSI information, and/or sensor data) to the localization system 155.

The localization system 155 represented in FIG. 1 includes the ingress point cloud 135, a room fingerprinting subsystem 140 (in some embodiments), a location subsystem 145, and an application cloud 150. The subsystems of the localization system 155 can internally communicate using real-time data streams (for example, Kafka streams) or a shared database.

The ingress point cloud 135 of the localization system 155 can receive tracking data from the access points 125 (for example, including received communications from tags 105, sensor data, and communications from one or more ALDs 120) and prepare that data for analysis by the rest of the localization system 155. Similarly, the ingress point cloud 135 can be responsible for managing the connected devices (including ALDs 120 and access points 125) and can, for example, detect new devices or if one or more devices go offline, fail to respond to a query, or otherwise need maintenance.

The room fingerprinting subsystem 140 of the localization system 155 can receive room reference data from one or more ALDs 120 and generate or update a room fingerprint or room fingerprint model associated with an ALD 120 or room (or otherwise use room reference data to improve localization). In some implementations, the location subsystem 145 analyzes the received tracking data to determine a location for each tracked tag 105. When determining a location for a tag 105, the location subsystem 145 can also factor in other data, such as room fingerprints for one or more rooms in the tracked space or occupancy change data reflecting changes in occupancy for one or more rooms. The determined location for a tag 105 can be represented by a room ID for the room the tag 105 is predicted to be inside, another indication of a specific room (or set of rooms), and/or a set of coordinates of the tag 105.

In some embodiments, the localization system 155 also includes an application cloud 150 which compares the determined tag 105 locations to one or more policies and/or takes actions based on the determined locations. The specific policies implemented by the application cloud 150 can depend on the context of the tracking (for example, what assets or people tags 105 are associated with and the type of building or space that is being tracked), but actions taken by the application cloud 150 can include notifying one or more parties, remotely controlling one or more devices inside or outside of the tracked space, logging the location data, and/or generating an application interface protocol, for example a stream, to communicate with one or more business applications and/or legacy systems 155 (for example, via an API stream or set of API calls).

The localization system 155 may also interface with business applications and/or legacy systems 155 which can make use of the location information determined by the localization system 155. For example, some legacy system 155 may have previously relied on manually entered location data (or other, less accurate, methods of determining tag 105 location) and can be updated to use location information from the localization instead. Business applications and/or legacy systems 155 can receive simplified location data, such as a set of geospatial coordinates or a room ID number and identifier of the tracked space (such as a building address).

Figure 2:
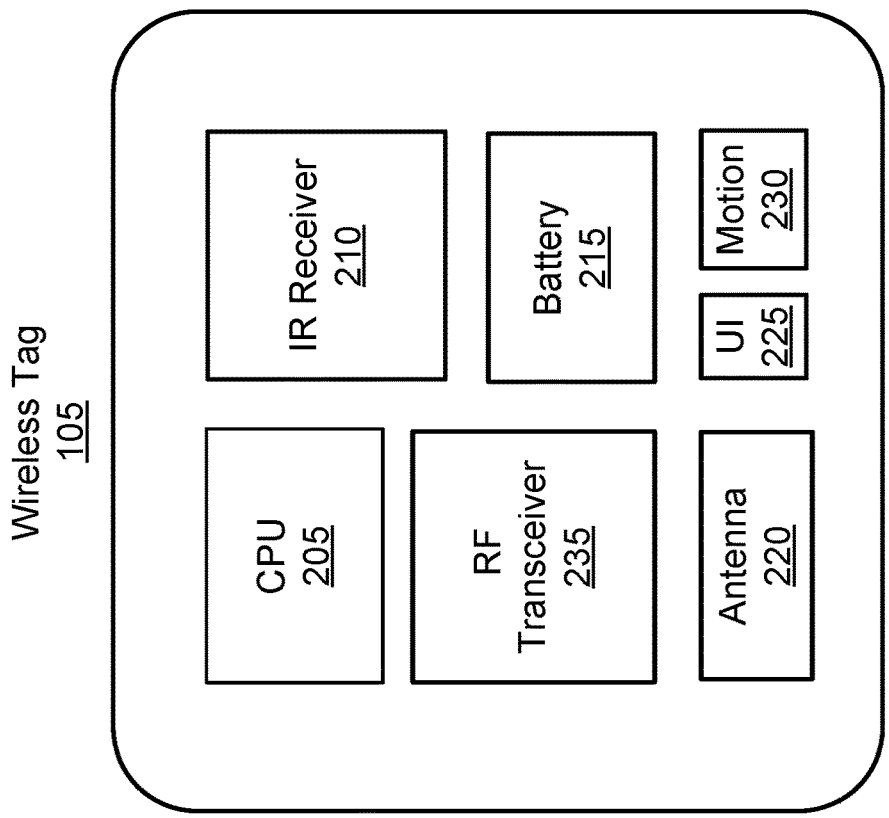
FIG. 2 is a block diagram of a wireless tag, according to an embodiment.

FIG. 2 is a block diagram of a wireless tag 105, according to an embodiment. As described above, a wireless tag 105 (e.g., tag 105) can be a battery-powered device whose location can be tracked by the localization system 155. Each tag 105 includes a CPU 205 RF transceiver 235 (for example, to send or receive BLE communications), antenna 220, and battery 215 (or other power source). In addition, a tag 105 can include other components to provide additional functionality, such as a temperature sensor, IR receiver 210, a user interface (UI) 225, and/or a motion sensor 230.

To be tracked by the localization system 155, a tag 105 can broadcast tracking packets (over BLE) including the MAC address (Media Access Control address), or other identifier of the tag 105. Depending on the implementation, a tag 105 can broadcast tracking packets periodically or based on the detection of one or more events. For example, a tag 105 can broadcast a tracking packet every minute, can broadcast in response to a UI input, based on receiving an IR communication, or based on detecting motion of the tag 105.

The tracking packets broadcast by the tag 105 can include additional tracking information that can help refine the location of a tag 105. For example, the IR receiver can be used, for example, to receive room ID codes broadcast from one or more ALD 120s or beacons. These room ID codes can then be included in a corresponding tracking packet broadcast by the tag 105. Similarly, motion sensor 230 data, time and date, and/or information received or derived by communication with an ALD 120 or beacon 300 can be incorporated into tracking packets sent by a tag 105.

The CPU 205 of the wireless tag 105 acts as a controller. The CPU 205, for example, may receive data from an IR or RF transmission and record a timestamp and/or RSSI associated with the transmission. The CPU 205 may additionally perform an action based on the content of received signals, such as making a change to the UI 225, activating the motion sensor 230, or sending a responsive signal, etc.

Figure 3:
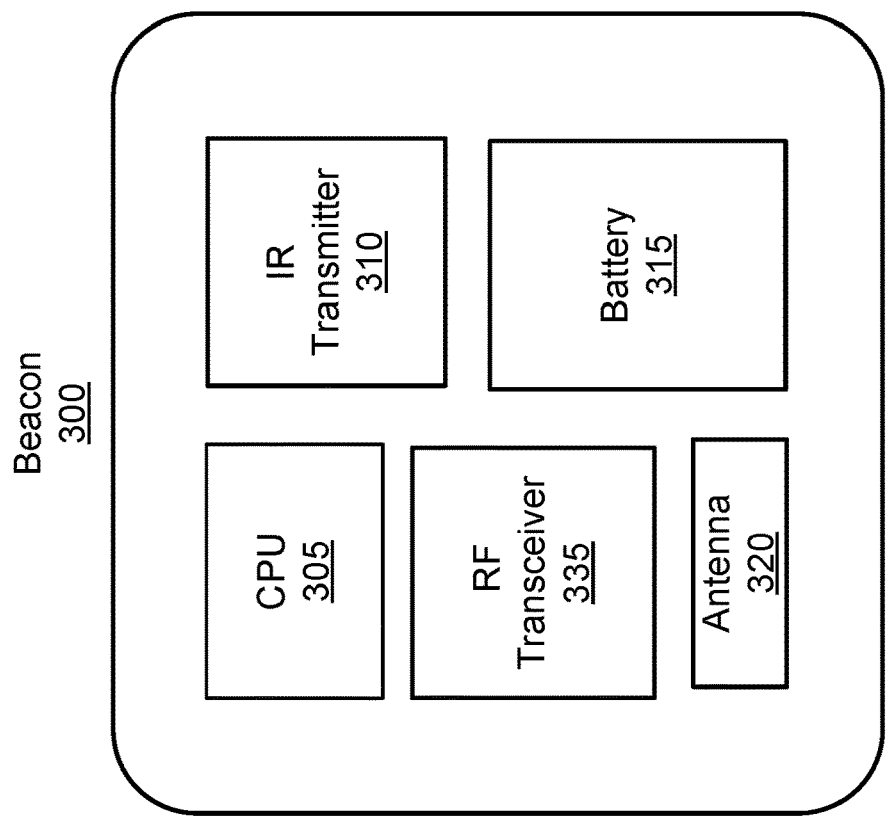
FIG. 3 is a block diagram of a beacon, according to an embodiment.

FIG. 3 is a block diagram of a beacon 300, according to an embodiment. A beacon 300 is a static (or mostly static) device whose location is known to the localization system 155. A beacon can include a CPU 305, RF transceiver 335 (for example, to send or receive BLE communications), an antenna 320, and battery 315 (or other power source). In addition, a beacon 300 can include other components to provide additional functionality, such as a temperature sensor and/or IR transmitter 310. ALDs 120, access points 125, and other devices may be examples of beacons 300 and a tracked space can additionally include standalone beacons 300 (for example, IR beacons to transmit an IR room ID code). In some implementations, beacons 300 periodically transmit BLE packets or other low energy RF packets to surrounding devices.

As described above, augmented localization devices (ALD 120s) are devices used by the localization system 155 to improve the accuracy and reliability of tag 105 localization. In some embodiments, the location of each ALD 120 is known to the localization system 155 and tracking data received from an ALD 120 can be linked to its location in the tracked space. Depending on the implementation, ALDs 120 can vary in included components and capabilities, with some being able to also function as access points 125 (or "gateways") and others being standalone devices operated in addition to access points 125 and gateways. Some implementations of a localization system 155 can include ALDs 120 with different capabilities. For example, to retrofit an existing space for object location tracking, a relatively small set of ALD 120 gateways can be dispersed to key rooms to increase access point 125 coverage of the space (in addition to or replacing existing access points 125) and a larger set of standalone ALDs 120 can be placed around the remainder of the space at a relatively lower cost (for example, one standalone ALD 120 to each room without a gateway). The CPU 305 of the beacon 300 acts as a controller.

Figure 4A:
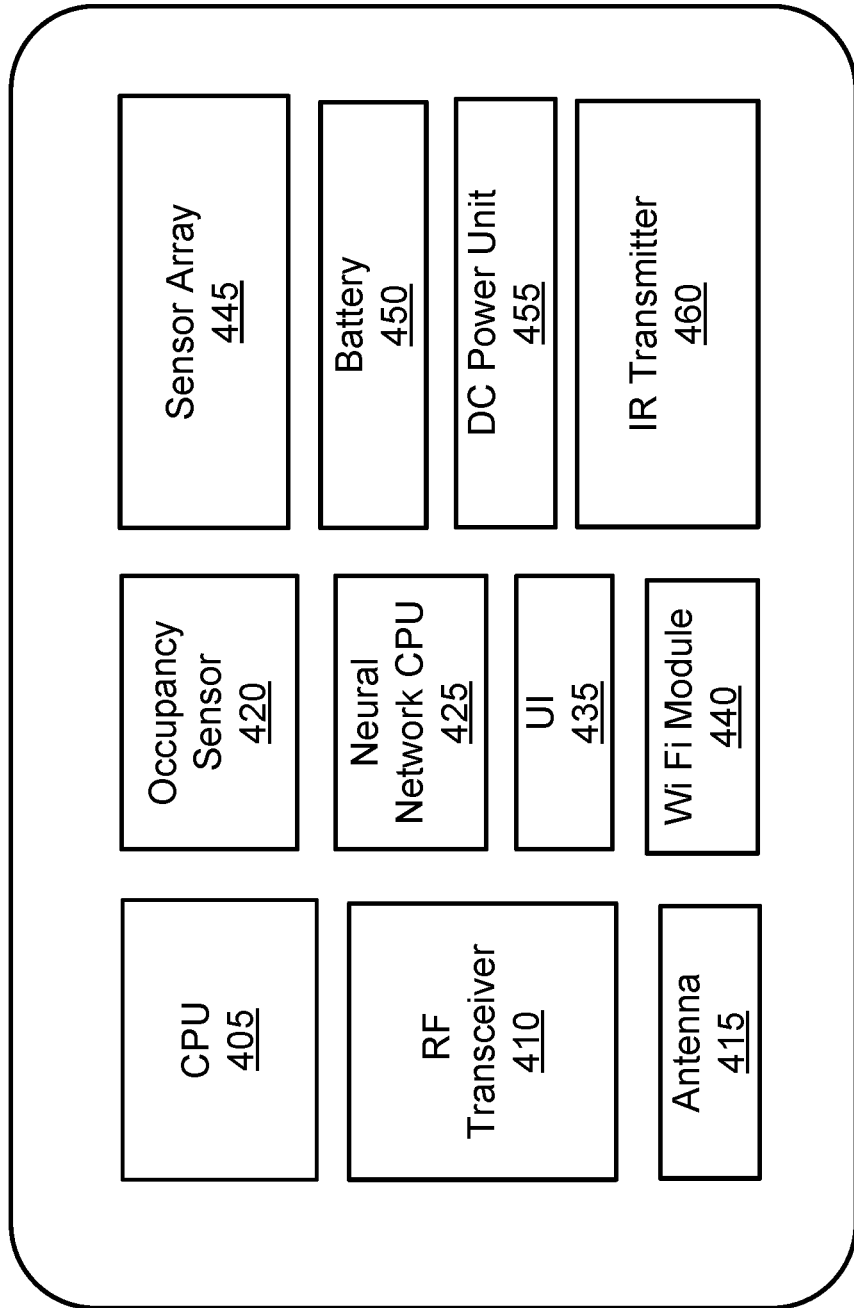
FIG. 4A is a block diagram of a first implementation of an augmented localization device, according to an embodiment.

FIG. 4A is a block diagram of a first implementation of an augmented localization device 400A (an embodiment of the ALD 120), according to an embodiment. The ALD 400A of FIG. 4A includes a CPU 405, RF transceiver 410, corresponding antenna system 415 (such as an omnidirectional antenna and/or multiple antennae and a multiplexer), and a power source (such as a battery 450, Power over Ethernet implementation, or DC power unit 455). An ALD 400A can include one transceiver 410 and one antenna 415 or, in other cases, multiple transceivers 410 with multiple antennae 415 or one transceiver 410, a multiplexer, and multiple antennae (omni or directional). Using directional antennae (or other multi-antenna configurations) may increase the reference data available to the localization system 155 from the same source (for example, multiple IDs can be transmitted associated with a single device and a single reference location). Additionally, this ALD 400A includes an occupancy sensor to detect the presence of one or more people near the ALD 400A. For example, an occupancy sensor can include a thermal camera, motion detector, or the like. An occupancy sensor system may be capable of separating people clustered together and/or eliminating false positive heat signatures such as those generated by non-human sources (such as a projector or a hot mug of coffee). In some implementations, an ALD 120 also includes a neural network CPU to process data from the occupancy sensor (for example, to process thermal camera image data to detect people in the captured images). This ALD 120 also includes a UI for receiving input from and/or communicating with one or more users and a Wi Fi module that can allow the ALD 120 to function as a gateway. As described above, an ALD 120 can include an IR transmitter that can transmit a unique (or locally unique) room ID to tags 105 in the same room as the ALD 400A. Similarly, the ALD 400A can also function as a fixed RF beacon.

ALDs 400A can also include a sensor array used to augment other IoT functions of the localization system 155 (or supported by the localization system 155). For example, the ALD 400A of FIG. 4A includes a sensor array 445 which may include temperature, humidity, carbon monoxide, air quality, light, and motion sensors. In some embodiments, an ALD 400A additionally includes acoustic sensors (such as omni or directional microphones). These sensors can be used to implement one or more policies or features of the application cloud 150. For example, the light sensors can be used to detect when lights are left on in a room that is currently unoccupied. Other implementations of an ALD 400A can include other, more, or different sensors depending on the situation and desired IoT functionality.

Figure 4B:
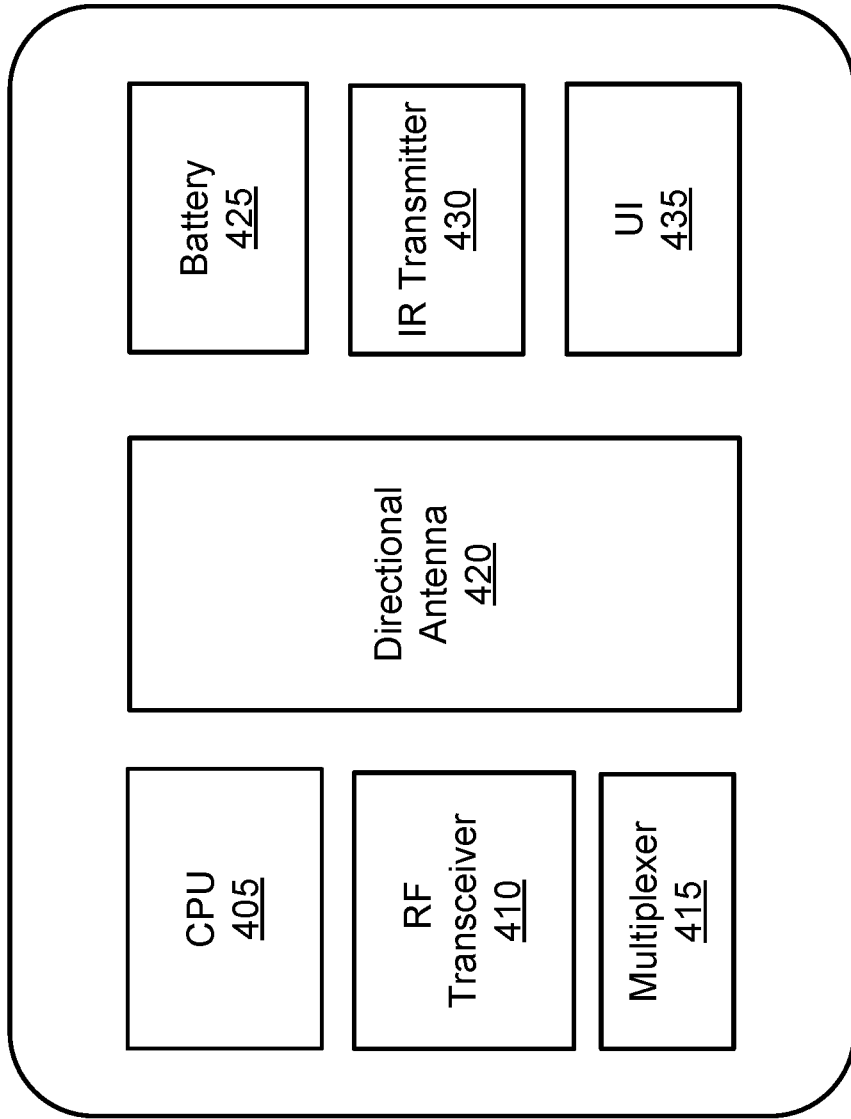
FIG. 4B is a block diagram of a second implementation of an augmented localization device, according to an embodiment.

FIG. 4B is a block diagram of a second implementation of an augmented localization device 400B, according to an embodiment. While FIG. 4A depicted an ALD 400A gateway, FIG. 4B shows an example of a standalone ALD 400B. The standalone ALD 400B of FIG. 4B includes a CPU 405, RF transceiver 410, antenna 420, IR transmitter 430, UI 435, and power source (here, a battery 425). In this case the standalone ALD 400B includes a directional antenna system 420 using a multiplexer 415 to receive and transmit BLE signals. In some implementations, standalone ALDs 400B that are battery powered can disable continuous usage of their RF transceivers 410 for receiving BLE signals (for example from tag 105) for power conservation purposes. Instead, standalone ALDs 400B can rely on other methods such as IR transmitted room codes, beacon transmissions over BLE, and/or limited-time use of the receiving capabilities of the RF transceiver to develop a room fingerprint based on RSSI data received at the standalone ALD 400B. To enable an ALD 400B to function on battery power for an extended period of time, a battery powered ALD 400B may communicate with the access points 125 primarily (or exclusively) using the low energy network (for example, BLE). Implementations using, for example, Wi Fi networks for data backhaul may draw too much power to operate on battery 425 alone (and require expensive power cabling or other additional infrastructure support). The RF transceiver 410 may be turned off to conserve power, for example, if the device has not detected any RF signals for an interval of time (e.g., 5 minutes or 30 minutes).

Figure 5:
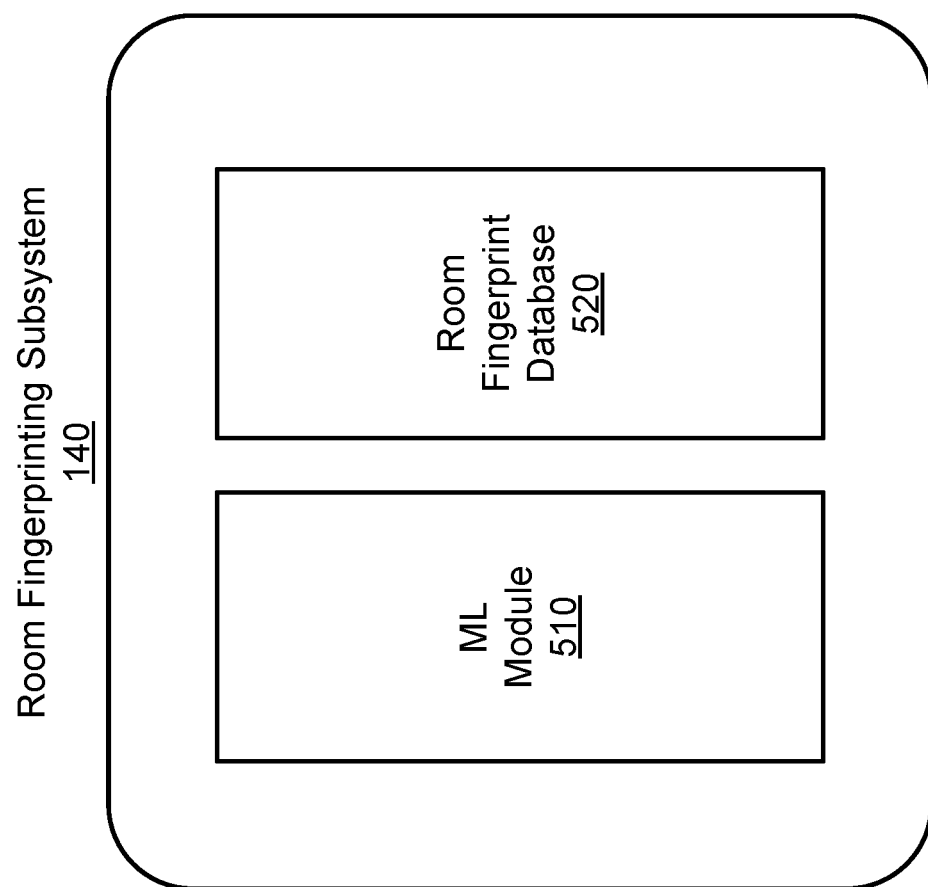
FIG. 5 is a block diagram of the room fingerprinting subsystem of an example localization system, according to an embodiment.

FIG. 5 is a block diagram of the room fingerprinting subsystem 140 of the localization system 155, according to an embodiment. Room fingerprint models can be machine learning models which create, update, and/or generate room fingerprints for one or more rooms within a tracked space based on room reference data. In some embodiments, the room fingerprint for a room predicts expected sensor data for a device located within the corresponding room (e.g., a range of expected RSSI values of a BLE source attempting to send or receive tracking packets from within the room). Room fingerprints may include time domain information (for example, to reflect expected changes in the room fingerprint over the course of a day as the RF environment of a room evolves).

In some implementations, the room fingerprinting subsystem 140 includes a machine learning module 510 which can train room fingerprint models. In some implementations, room fingerprint models can be trained based on room reference data including RSSI data that the ALD 120 of each room periodically gathers from transmissions of fixed BLE sources (for example, other ALDs 120 in adjacent rooms, access points 125, or beacons) surrounding the room. Room fingerprint models can be dynamically updated (for example, daily) to improve the quality of the room fingerprint and because changes in the tracked space (for example, moving furniture or other large objects) can affect the room fingerprint for a room. In some implementations, a room fingerprint model is a machine learning process which creates, records, and updates a room fingerprint represent the room and modeling the environment's impact on signals traveling into and out of the room. A room fingerprint can be associated with a room ID and includes a range of RSSI values which are expected when sending and receiving signals from or into the room.

The room fingerprinting subsystem 140 can also include a room fingerprint database 520 storing the generated room fingerprints for access by the localization system 155. As described above, the subsystems of the localization systems 155 can communicate using Kafka data streams (in the case of the room fingerprinting subsystem 140, to receive the RSSI data needed to generate or update the room fingerprints), and API functions (for example, to provide room fingerprints from the room fingerprint database to the location subsystem 145 or a shared database).

Figure 6:
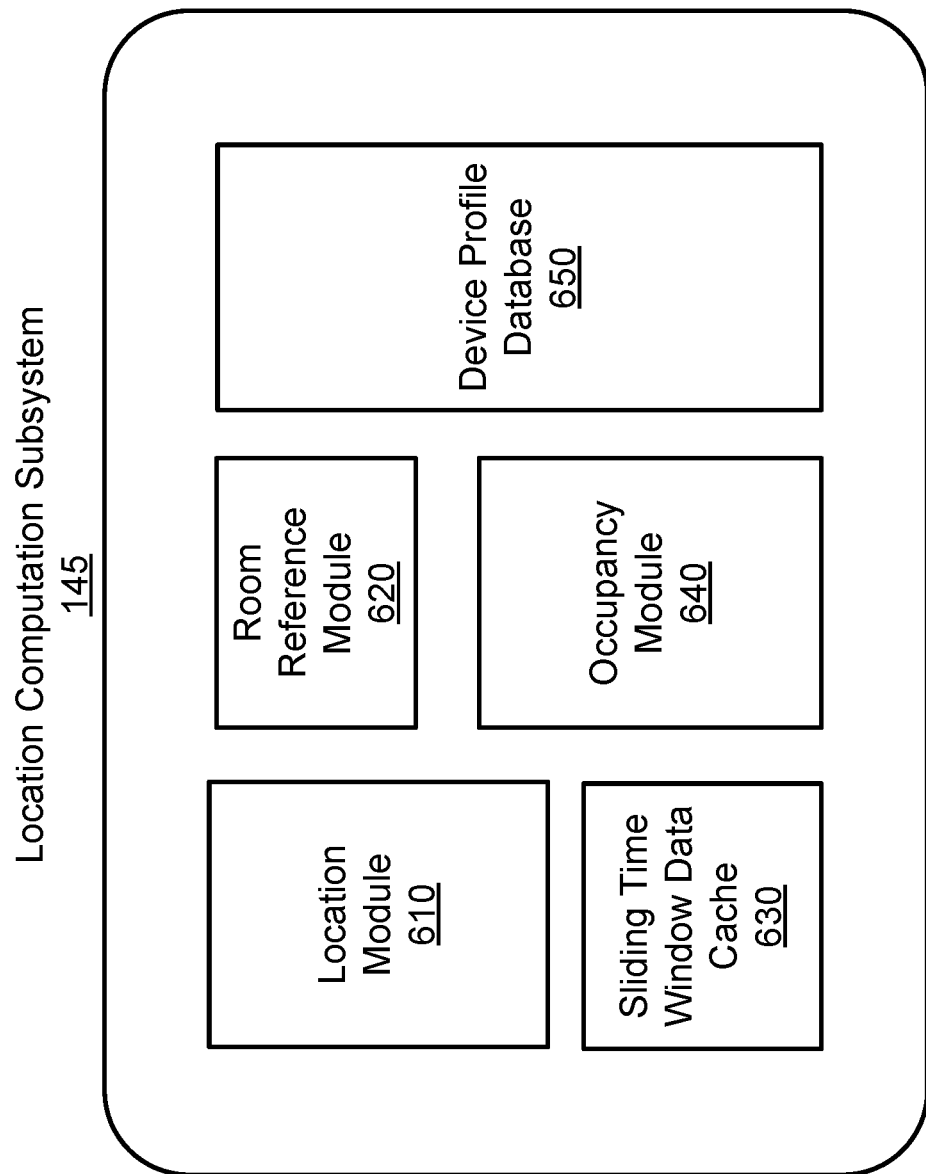
FIG. 6 is a block diagram of the location subsystem of an example localization system, according to an embodiment.

FIG. 6 is a block diagram of the location computation subsystem 145 of an example localization system 155, according to an embodiment. The location subsystem 145 can include a location module 610 to perform localization calculations (for example, trilateration) based on received tracking data as well as other modules that can prepare tracking data to be factored into the localization calculation. For example, a trilateration calculation may yield multiple possible results, for example by using a particle filter (Markov chain), and probabilistically select the "best" outcome. Localization augmentation data (like occupancy data) can be used to adjust the relative weights of each possible outcome. For example, if one possible room has a person in it and the other candidate rooms are empty (and the localization system 155 is attempting to locate a tag 105 identified as attached to a human), the occupied room can be assigned a higher relative weight.

For example, the location subsystem 145 can include a sliding time window data cache 630 that temporarily stores tracking data as it is received from access points 125. Localization calculations can be based on data from different sources (including directly received data and data received through a vendor or $3^{rd}$ party system) that may result in a delay in receiving tracking data related to the same tag 105 broadcast.

The room reference module 620 can retrieve an appropriate room fingerprint from the room fingerprinting subsystem 140 that can be factored into the localization calculation. Similarly, the occupancy module 640 can receive and supply occupancy data for rooms in the tracked space (for example, as determined by ALD 120s) to the location module. Similarly, the device profile database 650 can store information about each tracked tag 105 and/or access point 125 that can affect the calculation (such as an expected format of the tracking packet, a baseline signal strength for the transmission of the tracking packet, the nature of the object to which the tag 105 is attached to, and the like). In other embodiments, the location subsystem 145 may include additional, fewer, or different components for various applications. Conventional components such as network interfaces, security functions, load balancers, failover servers, management and network operations consoles, and the like are not shown so as to not obscure the details of the system architecture.

FIGS. 7-13 illustrate use cases of the localization system 155. In these figures some objects are referred to with reference numbers followed by a letter (e.g., access point 125a). In cases where the object is followed by only the number and no letter (e.g., access point 125), the text may describe all devices of that kind present in the figure (e.g., access points 125a, 125b, and 125c) or any one of such devices, depending on the context. Note that, for example, access points 125a, 125b, and 125c may be independent devices rather than a single device that has moved.

Figure 7:
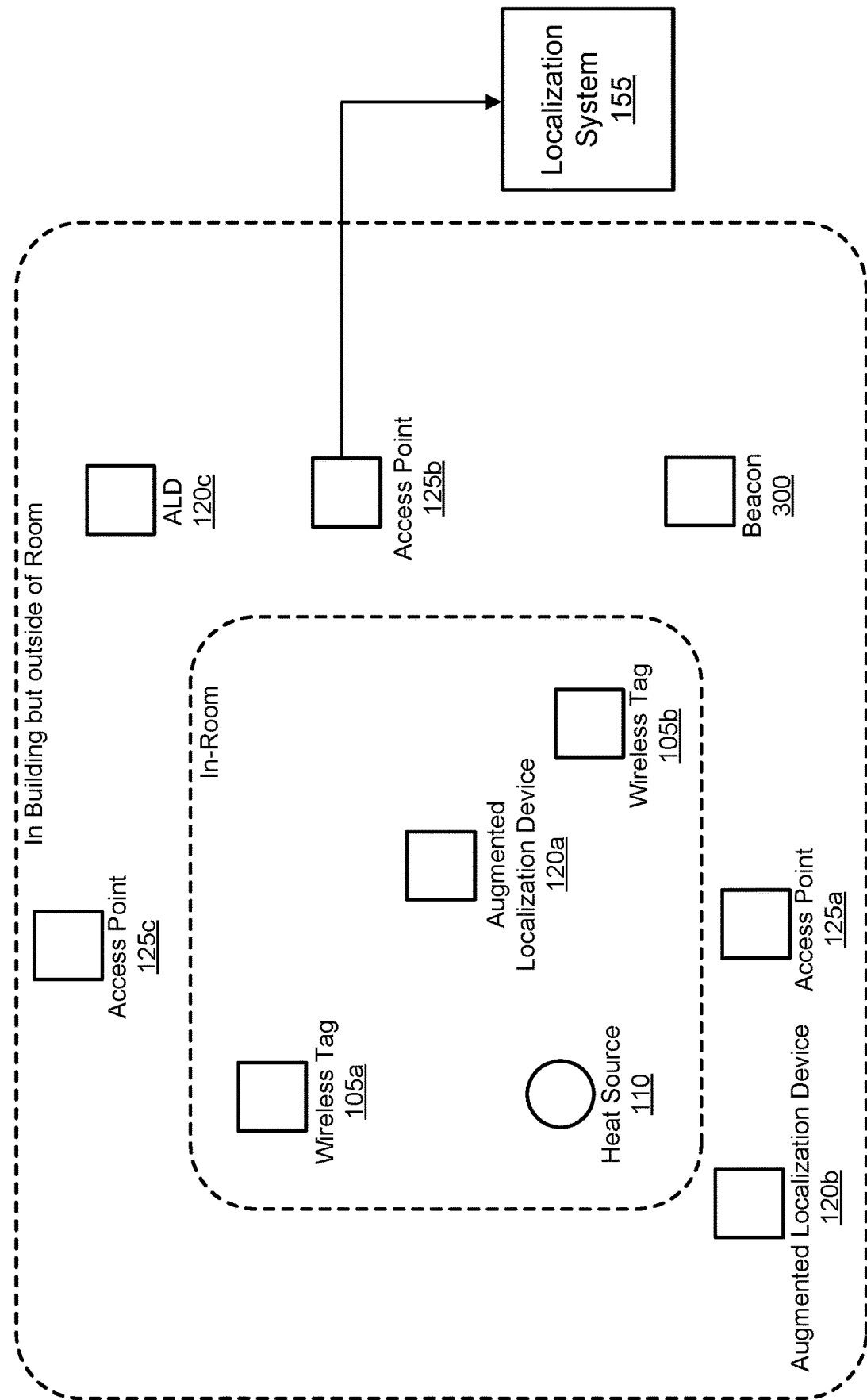
FIG. 7 illustrates an example tracked space in which a localization system can track a tag, according to an embodiment.

FIG. 7 illustrates an example tracked space in which a localization system 155 tracks a tag 105, according to an embodiment. The room highlighted in the example tracked space of FIG. 7 includes multiple wireless tags 105a and 105b including one with an IR receiver, an ALD 120, and a heat source 110 (e.g., a human). Outside of the room, but still within the same building, are several access points 125 with a network connection to the localization system 155 (for example, taking BLE signals and relaying them using TCPIP over an 802.11 LAN or Ethernet connection). Other rooms in the tracked space include fixed BLE sources such as ALDs 120 positioned in other rooms and other BLE beacons, such as beacon 300.

Figure 8:
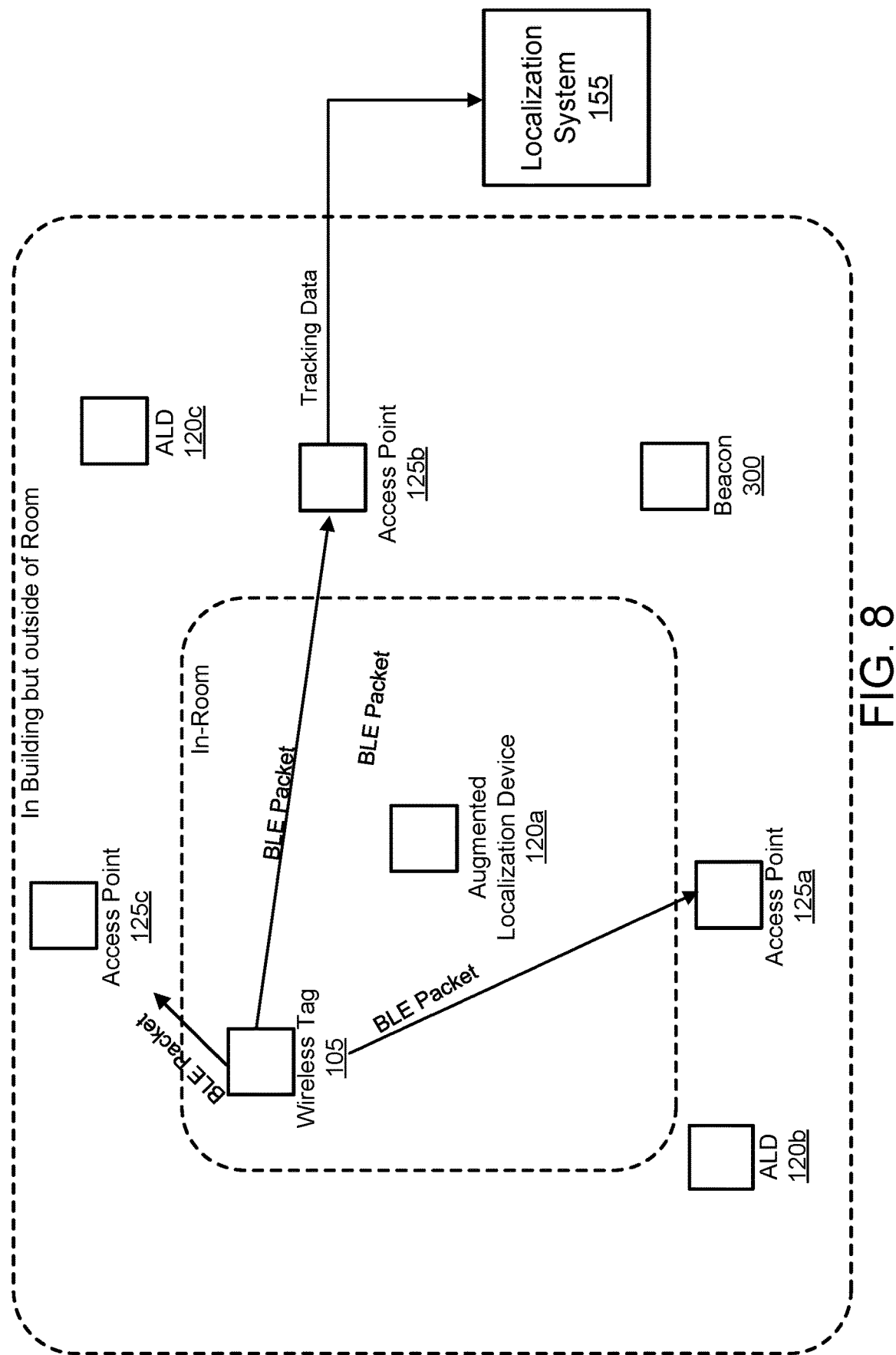
FIG. 8 illustrates localizing a wireless tag in an example tracked space, according to an embodiment.

FIG. 8 illustrates localizing a wireless tag 105 in an example tracked space, according to an embodiment. To begin the process, the wireless tag 105 transmits a BLE packet (could be an iBeacon®, Eddystone®, Telemetry, or other tracking packet) including a MAC address of the tag 105 to an access point 125 (any or multiple of a, b, or c) or gateway. ALD 120 gateways or access points 125 receive the tracking packet and capture the receiving time and the received RSSI of the tracking packet. Each access point 125 transmits this tracking data (for example, tracking data can include a MAC address or other identifier of the tag 105, the RSSI, and a time the tracking packet was received) to the localization system 155 (for example through the internet). The localization system 155 uses the tracking data for the tag 105 to calculate a location baseline for the tag 105 with or without interpolating other sources.

In the shown example, each access point 125a, 125b, and 125c may receive the same BLE tracking packet from the wireless tag 105 but receive it with a different RSSI due to their positioning relative to the tag 105. For example, there may be an open door between the wireless tag 105 and access point 125a, allowing access point 125 to receive the tracking packet with a higher signal strength than access points 125b and 125c which may be separated from the tag 105 by signal attenuating walls. The localization system 155 may include a model of the building and its rooms with a detailed schematic of walls, doors, and windows. This model allows the localization system 155 to determine the location of the wireless tag by interpreting the signal strengths from each access point 125 based on the position of the access points. Therefore, though access point 125a receives the highest RSSI in this example, the localization system 155 determines that the wireless tag 105 is actually closest to access point 125c but is separated by a wall.

Figure 9:
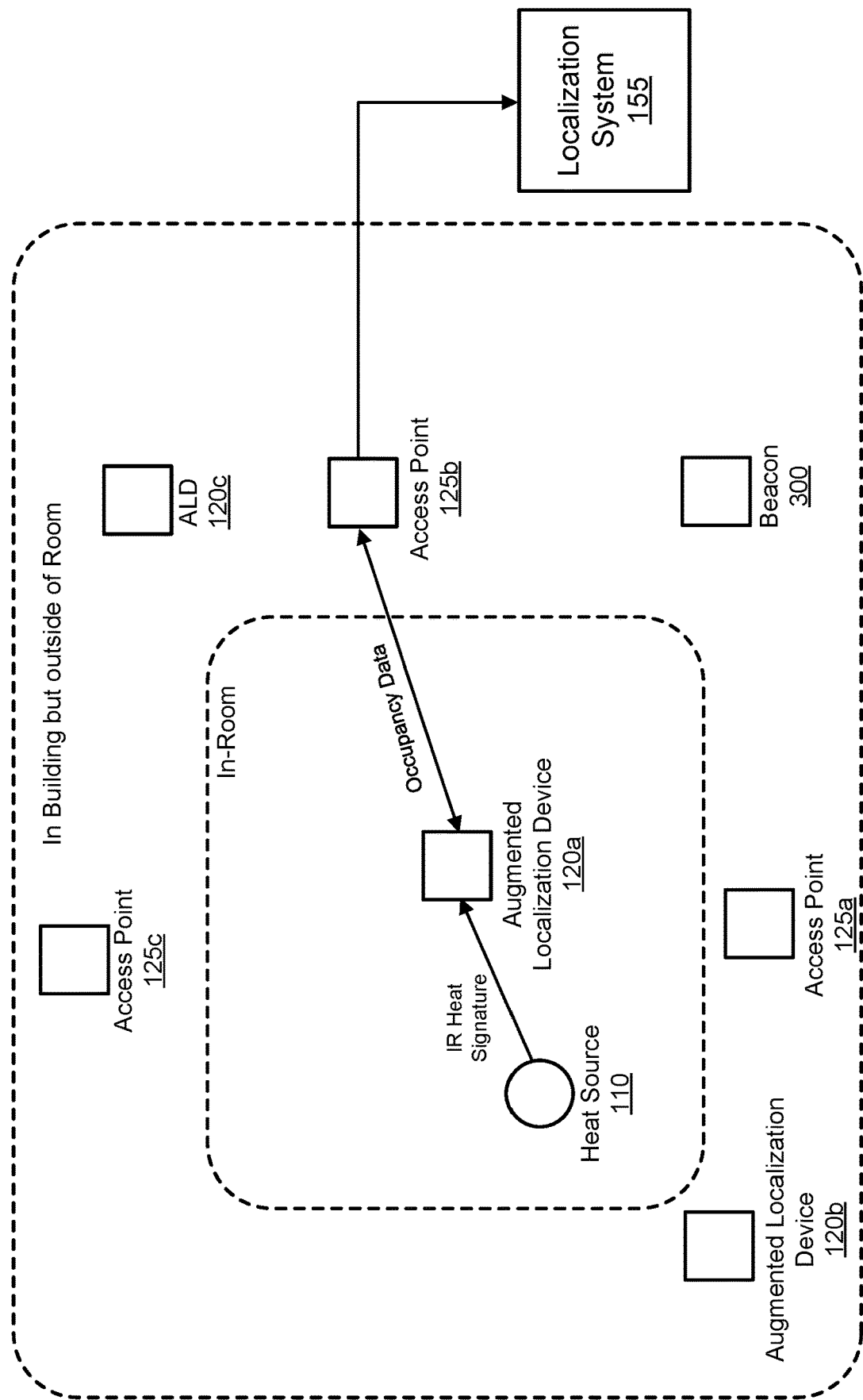
FIG. 9 illustrates using an augmented localization device to determine an occupancy model of the tracked space, according to an embodiment.

As described above, the localization system 155 can factor in room occupancy data when trying to localize tags 105 to particular rooms. For example, a tag 105 can correspond to a person or other moveable asset (such as an infusion pump, which can only change its location when moved by a human). FIG. 9 illustrates using an augmented localization device to determine an occupancy model of the tracked space, according to an embodiment.

In some implementations, tracking occupancy can begin with the ALD 120a activating a thermal camera (triggered, for example, every ten second, every, minute, or based on detected motion, etc.). Using machine learning, the ALD 120a can analyze the thermal camera output to determine a number of people in the room (based on their IR heat signatures) and determine coordinates of those people relative to the ALD 120a. The ALD 120a can then transmit the determined occupancy data (for example, number of people and coordinates) to a nearby access point 125 using BLE. Any of access point 125a, 125b, or 125c may be used. In some cases, all 3 access points may receive the occupancy data. The access point 125 can then forward the occupancy data to the localization system 155, which uses the new occupancy data to update an occupancy module of the tracked space. The localization system 155 can use occupancy data and (including occupancy change data when rooms are entered and left) to inform a location probability model and increase tracking accuracy and/or for other IoT features. The localization system 155 can use this data to inform functionality relying on occupancy or occupancy changes, for example to understand space utilization or to verify that a space is empty in emergency situation (i.e., evacuated) or to determine human traffic and journey times inside buildings. For example, detecting if a shared use room (such as a conference room or shared workspace) is occupied.

For example, if the process of FIG. 8 was used, the RSSI data from the access points 125 may not be enough for the localization system 155 to determine if a tag 105 (e.g., worn by a human) is in a first room or a second adjacent room (not shown). The occupancy data showing a heat source 110 in the first room confirms that the tag 105 associated with the heat source 110 is in the first room. In the case of multiple tags 105 and/or multiple heat signatures the occupancy data may be used by the localization system to determine weighted possibilities of the tag 105 locations.

Figure 10:
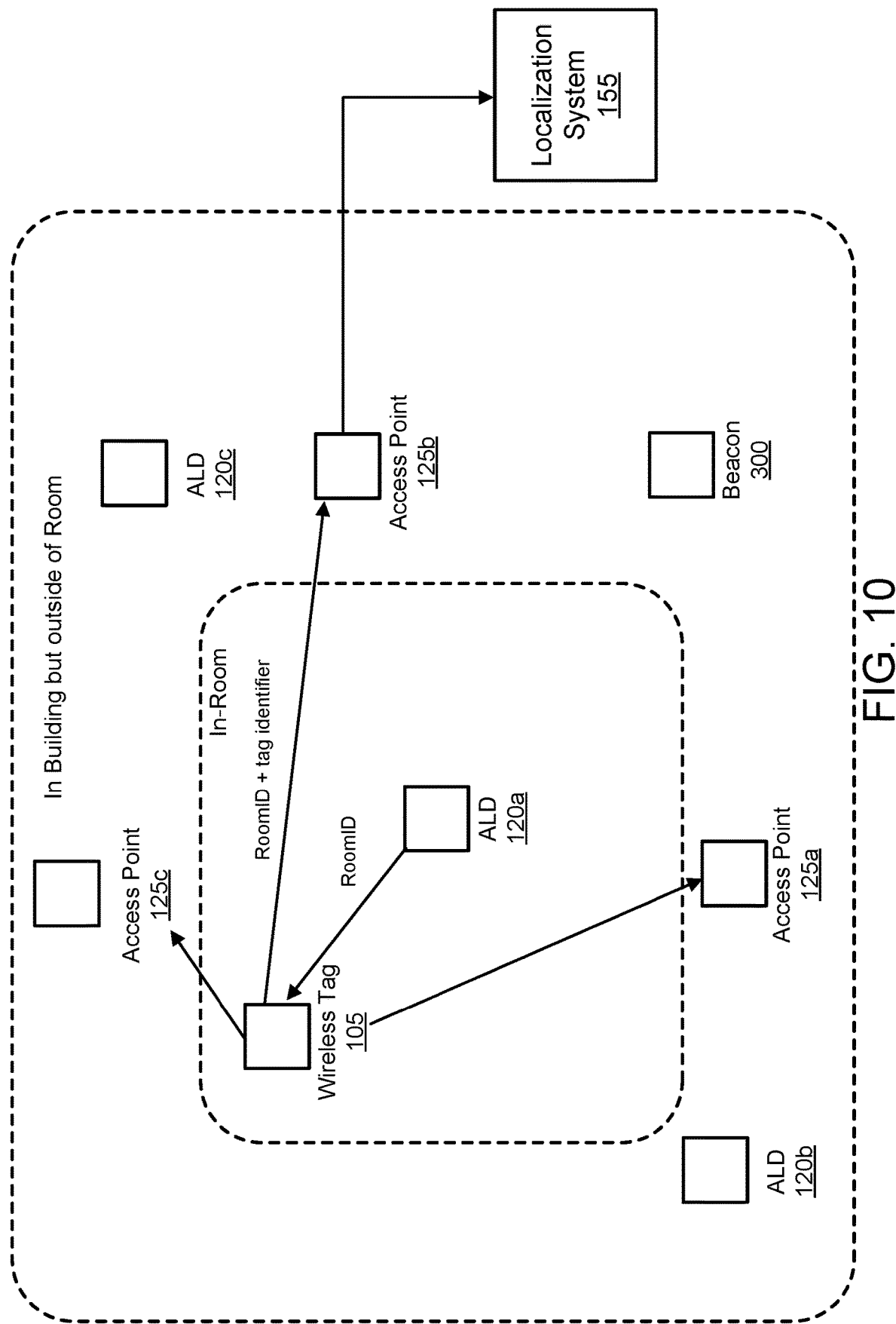
FIG. 10 illustrates localizing a wireless tag using an IR beacon, according to an embodiment.

In some implementations, the localization system 155 can implement IR augmented localization, using wireless tags 105 with IR receivers and ALD 120s configured to broadcast coded IR signals. FIG. 10 illustrates localizing a tag 105 using an IR beacon, according to an embodiment. Wireless tags 105 with IR receivers can periodically wake up and record an encoded RoomID transmitted by the ALD 120 of the current room. Waking up may entail the tag 105 going from a low powered sleep mode to a fully active mode. Alternatively, the tag 105 may wake up upon detecting an IR signal and record that signal. The tag 105 may also be programmed to wake up and enter sleep mode periodically or after a set interval of time wherein no signals have been received. Then the tag 105 can broadcast a tracking packet including the received RoomID along with a tag identifier such as the MAC address of the tag 105 to nearby access points 125. The RoomID may be an identifier that is unique or locally unique (such as within a building or within a single floor of a building) to the room. The receiving access point 125 can relay the received tracking packet to the localization system 155 as discussed above.

Because IR signals do not penetrate walls or other solid objects well (compared to, for example BLE signals), the localization system 155 can infer that tags 105 receiving an IR signal with and RoomID from an ALD 120a share a room with that ALD 120a. However, because the bandwidth of the coded IR signals transmitted from an ALD 120 may be severely limited (sometimes to only a few digits), a tracked space may have too many rooms to assign each room or ALD 120 a unique RoomID.

To circumvent this issue, rooms can be assigned locally-unique RoomIDs (RoomIDs for which no duplicates exist in an immediate vicinity, even if a duplicate RoomID is assigned somewhere else in the building). When processing locally-unique RoomID, the localization system 155 can perform an RoomID duplication removal method to extract a single RoomID and/or coordinate of the tag 105 based on the received RoomID. For example, the duplication removal process can use an estimated location of the tag 105 (without the benefit of the RoomID data) and look up the nearest room associated with a matching RoomID. The localization system 155 can then use the IR data to improve location computation of the tag 105 (based on RSSI or other data sources). In some implementation, a matched RoomID can override other location calculations.

Figure 11:
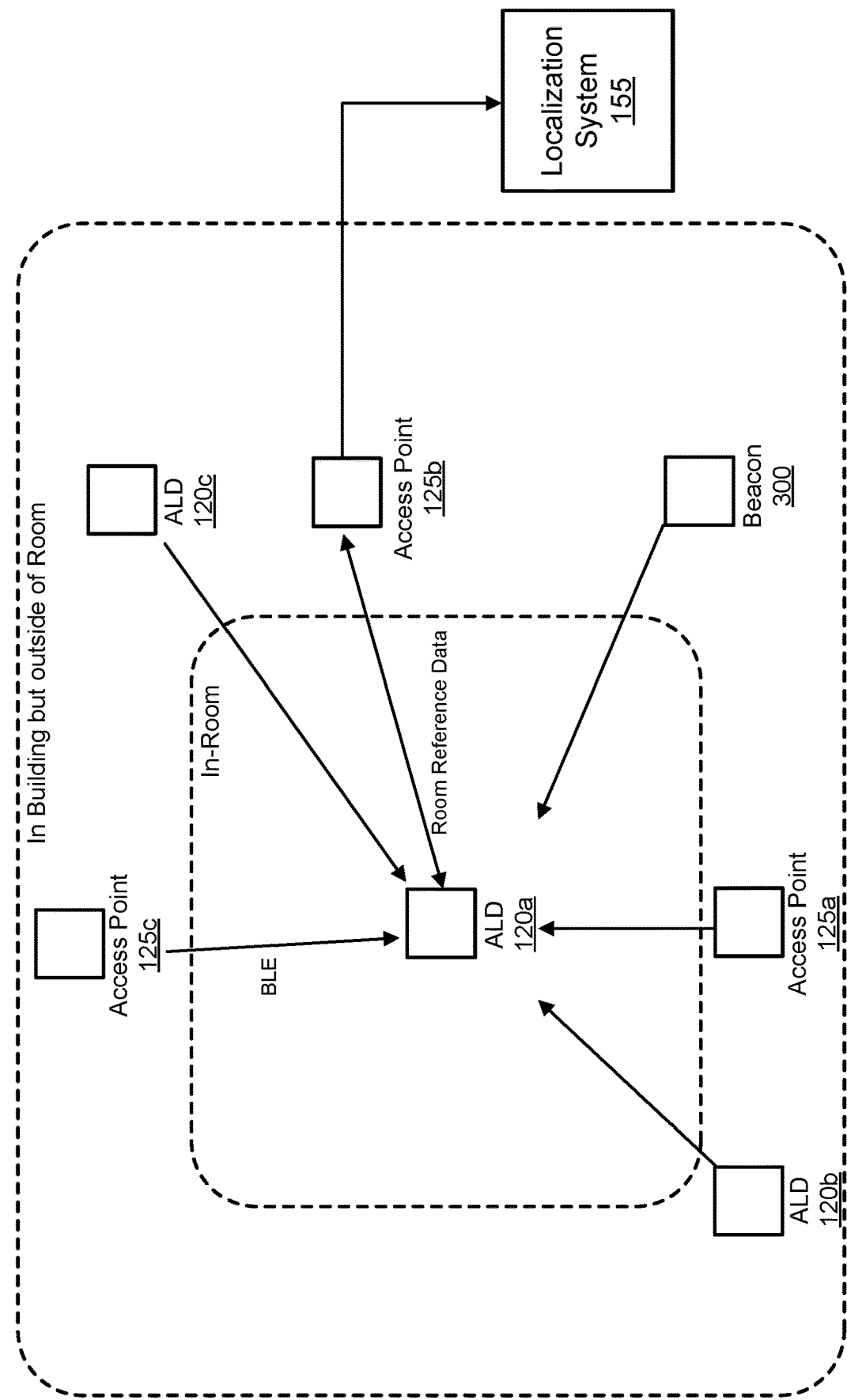
FIG. 11 illustrates determining a room fingerprint using an augmented location device, according to an embodiment.

Similarly, a localization system 155 can use ALD 120s to determine room fingerprints to aid in the localization of tag 105s. FIG. 11 illustrates determining a room fingerprint using an augmented location device 120, according to an embodiment. A room fingerprint is characterized by what objects (access points, beacons, tags, etc.) an ALD in a room is able to communicate with. To develop a room fingerprint for a room an ALD 120a in the room opens a radio receiver and records BLE broadcasts from fixed BLE sources (access point 125a, 125b, and 125c, ALDs 120b and 120c, and beacon 300). In some implementations, this process occurs periodically (for example, once per day for one minute). The ALD 120a can record RSSI information, a source MAC address (or other identifiers), and/or Time of Flight information for BLE packets received from the fixed BLE sources and/or other sources in the tracked space. For example, objects such as other ALD 120s, BLE beacons, and access point 125s are considered fixed and can be used to develop a room fingerprint. The ALD 120 can then deliver room reference data that is based on the received BLE packets over BLE to a gateway or access point 125b. The access point 125b relays the room reference data to the localization system 155. As described above, the localization system 155 can use the room reference data to feed a ML based fingerprint store. The fingerprint database can be dynamically updated with reference RSSI levels from within the room (as captured each day) or to update a statistical model of RSSI levels within a room. Similarly, to the occupancy data, the localization system 155 can create a model of the objects in the room based on the room reference data and use that model to weight predictions of where tags 105 are located.

Figure 12:
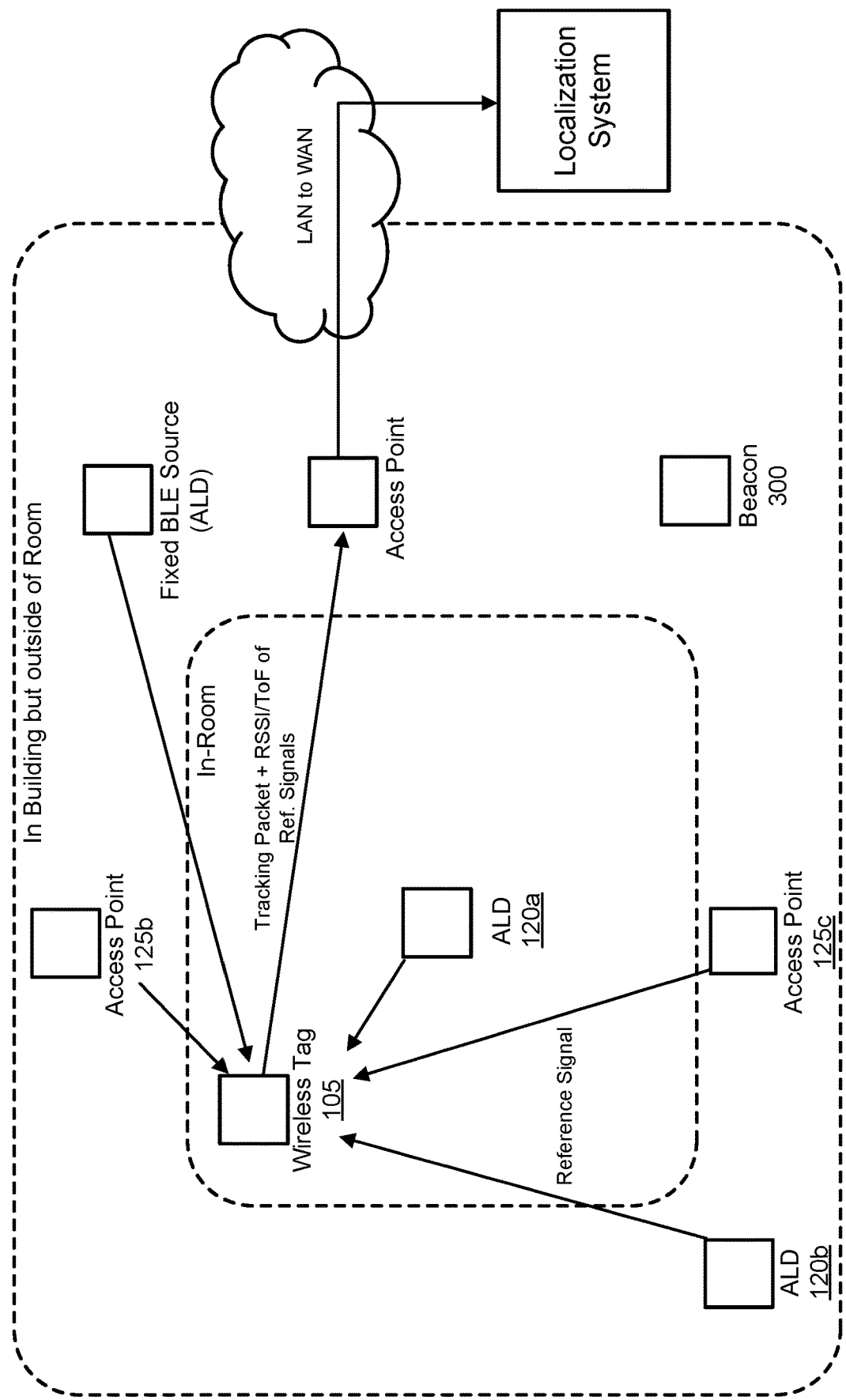
FIG. 12 illustrates augmenting localization information based on time of arrival or RSSI information as received by a wireless tag, according to an embodiment.

FIG. 12 illustrates augmenting localization information based on time of arrival (ToA) or RSSI information as received by a tag 105, according to an embodiment. In some implementations, a tag 105 can also gather RSSI data (or other location data) from ALD 120s and access points 125 to improve its own localization accuracy. In some implementations, ALD 120s, access point 125s, and/or BLE beacons 300 can transmit a reference BLE signal (typically using iBeacon® or Tracking packet format). Wireless tags 105 can periodically open their RF receivers to gather this information. In some implementations, the tag 105 filters received messages by device ID to only collect data from ALD 120s, known BLE beacons, access points 125, or other known BLE sources) and records time and received RSSI from the filtered devices. Additionally, a tag 105 (or localization system 155) can implement Time of Flight (or Time of Arrival) methods to estimate range from the tag 105 to the ALD 120s or other known sources. When the tag 105 sends out its tracking packet over BLE, the tag 105 includes the gathered RSSI and/or Time of Flight information in the transmission (and ultimately forwarded to the localization system 155). The localization system 155 can then use the additional RSSI data gathered by the tag 105 to improve the accuracy of the corresponding location. For example, the localization system 155 can determine which other device (such as an ALD 120 or access point 125) is closest to the tag 105 based on the tag's 105 gathered RSSI data and provide a higher weight to the room the closest device to the tag 105 is installed in when performing the localization calculations.

Figure 13:
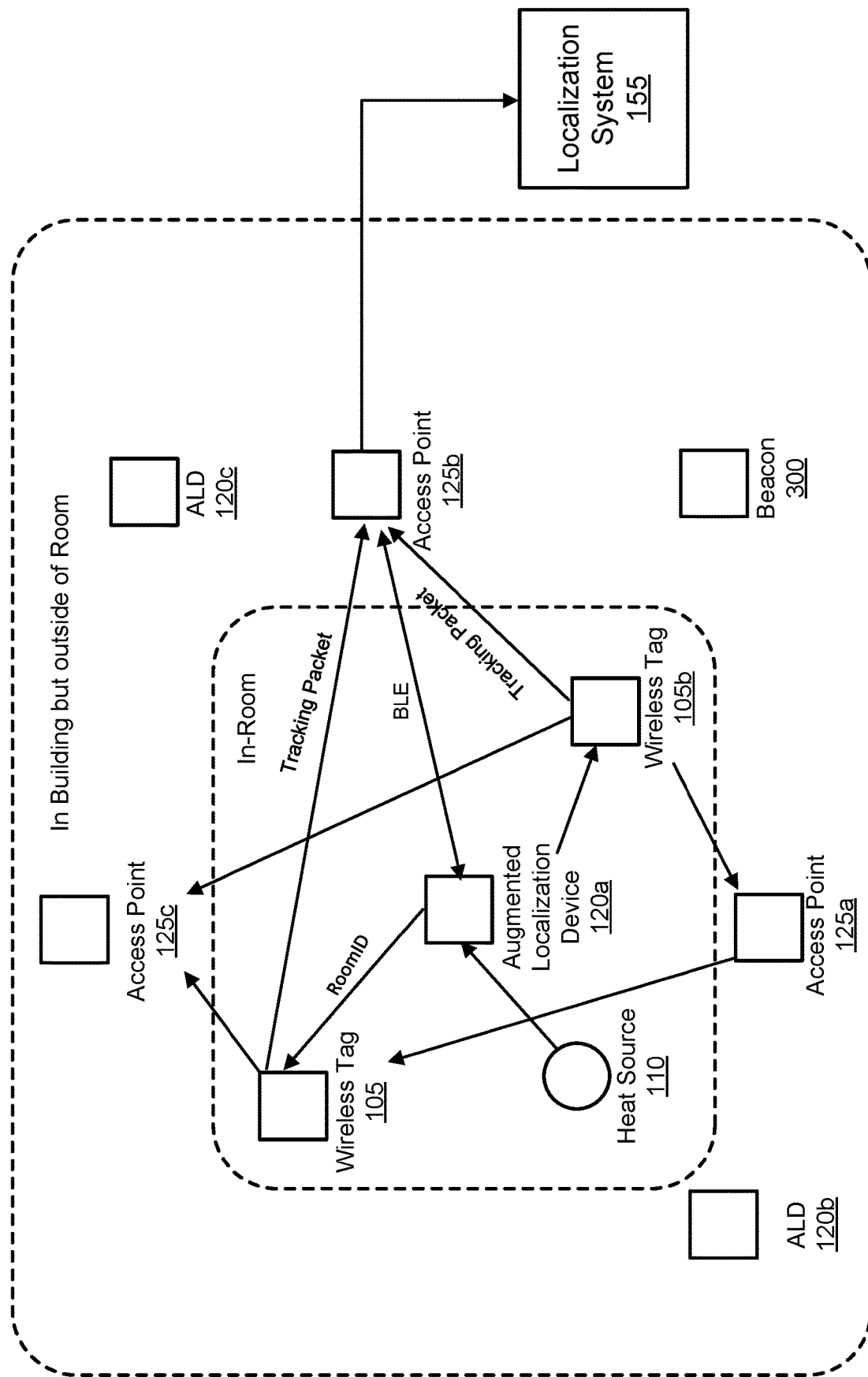
FIG. 13 illustrates augmenting localization using multiple disclosed methods, according to an embodiment.

FIG. 13 illustrates augmenting localization using multiple disclosed methods, according to an embodiment. In some implementations, the localization system 155 employs some or all the techniques discussed above to improve the object location tracking performance using ALD 120s. FIG. 13 discloses possible transmissions occurring in an environment when a localization system 155 is using multiple disclosed localization enhancement methods simultaneously. For example, a localization system 155 may improve the location accuracy of the same tracking packet using occupancy data, a RoomID included in the tracking packet, and room fingerprints for rooms in the tracked space, as described above.

Figure 14:
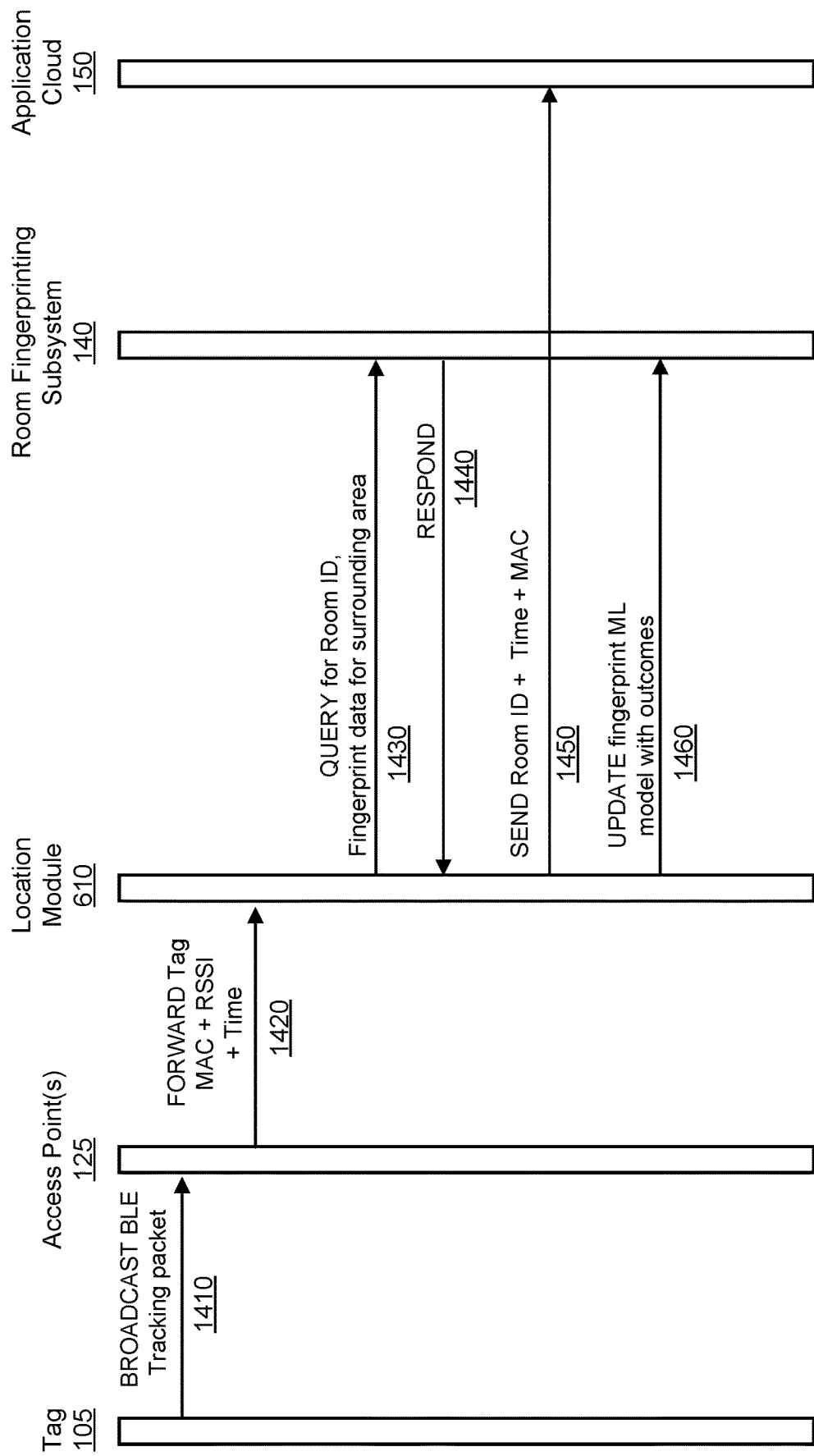
FIG. 14 is an interaction diagram illustrating an example process for localizing a tag using RSSI data and room fingerprints, according to an embodiment.

FIG. 14 is an interaction diagram illustrating an example process for localizing a tag 105 using RSSI data and room fingerprints, according to an embodiment. The process of FIG. 14 can begin when a tag 105 broadcasts 1410 a BLE tracking packet including a MAC address of the tag 105 to surrounding access point 125s and/or gateways. The access point 125s/gateways each forward 1420 the MAC address of the tag 105, RSSI for the received transmission, and a time the transmission was received to the localization system 155. At the localization system 155, the location module 610 can begin analyzing the received tracking data to determine a location of the tag 105. In some implementations, the location module 610 determines a rough estimate of the location of the tag 105 (for example, based on trilateration without using room fingerprints) and, using that estimate, queries 1430 the fingerprint store for room IDs and room fingerprints for the rooms in the estimated area. After the fingerprint store responds 1440 with the requested information, the location module performs a location calculation (such as trilateration) using the room fingerprints to determine a room ID of the tag 105's location. The location module 610 sends 1450 location information for the tag 105 (including the room ID, MAC address of the tag 105, time, confidence of the predicted location, and the like) to the application cloud 150. Similarly, the room ID determination can be used to update the room fingerprint model for the room and generate an updated room fingerprint associated with the room ID.

Figure 15:
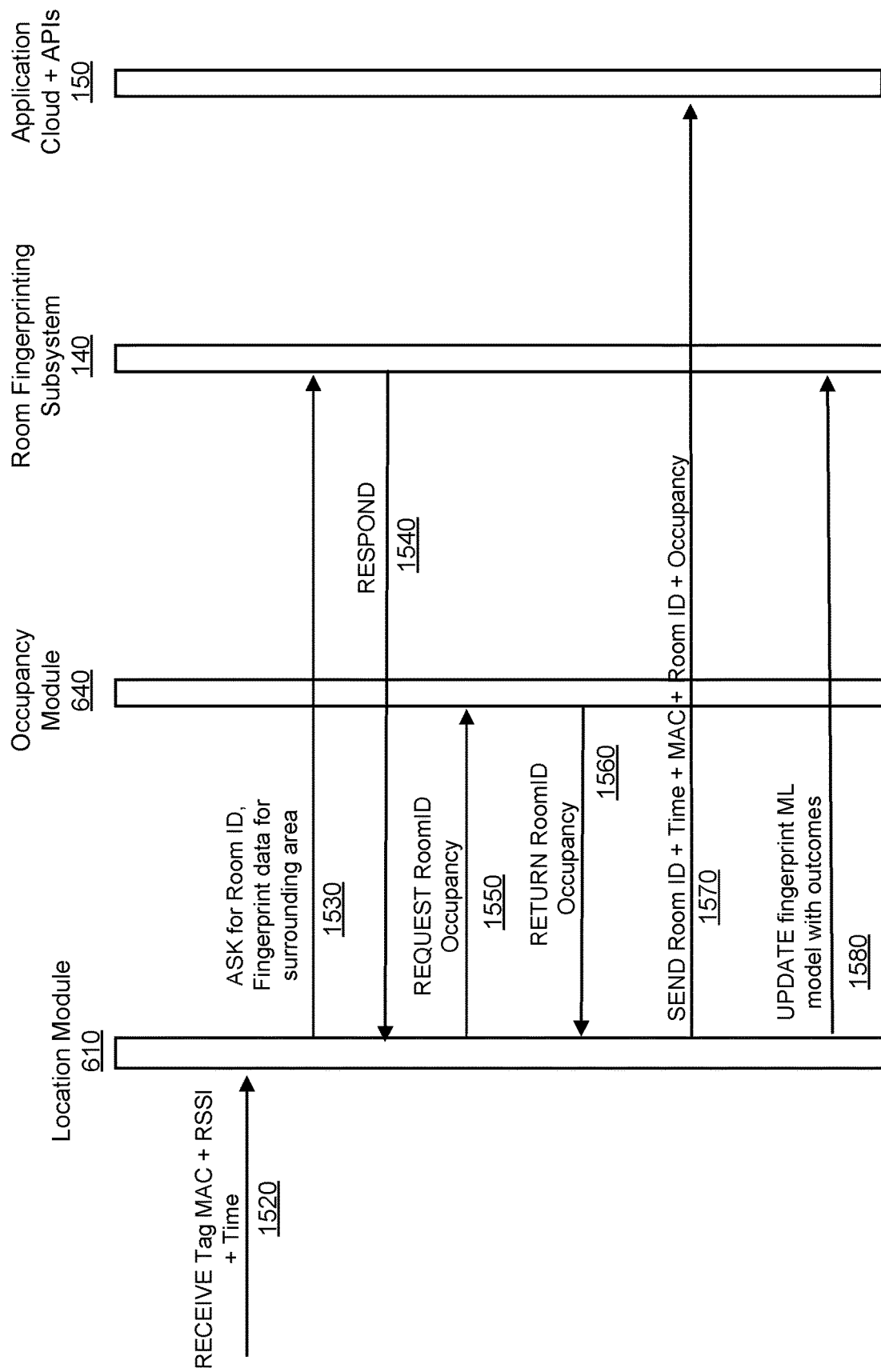
FIG. 15 is an interaction diagram illustrating an example process for localizing a tag using RSSI data and occupancy data, according to an embodiment.

FIG. 15 is an interaction diagram illustrating an example process for localizing a tag 105 using RSSI data and occupancy data, according to an embodiment. The process of FIG. 15 begins similarly to the process of FIG. 14, but the location module additionally receives 1520 an identifier of a tag 105 such as a MAC, as well as an RSSI, timestamps, and/or ToF. The location module 610 asks 1530 the room fingerprinting subsystem 150 for a RoomID and fingerprint data of the surrounding area of the room. The room fingerprinting subsystem 150 responds 1540 to the location module 610 with the requested data. The location module 610 requests 1550 RoomID occupancy data from the occupancy module for a room associated with the RoomID (for example, after requesting occupancy data for rooms near the rough estimate of the location of the tag 105) to factor into the trilateration calculation, and the occupancy module 640 returns 1560 the requested occupancy data of the room. For example, the location module can use the occupancy or occupancy change data to weight rooms with occupants as more likely locations for a tag 105 associated with a person or to prioritize rooms where an occupancy change has occurred as locations for tag 105s which have changed locations recently. In some implementations, occupancy data (for example a room ID and number of occupants) can also be used by the application cloud 150 (and other services) to trigger actions within the tracked space, without the need for specific tracking of tag 105s. For example, occupancy data can be used to control lights or the thermostat for specific rooms, to determine space utilization for a desk or space, or determining if a space is empty in emergency evacuation scenarios. Once the location module 610 has the occupancy data it sends 1570 the data to the application cloud 150. In some embodiments the application cloud 150 may respond with an action to perform based on the received data. The determined locations of the tags are sent to the room fingerprinting subsystem 140 to update 1580 the ML model.

Figure 16:
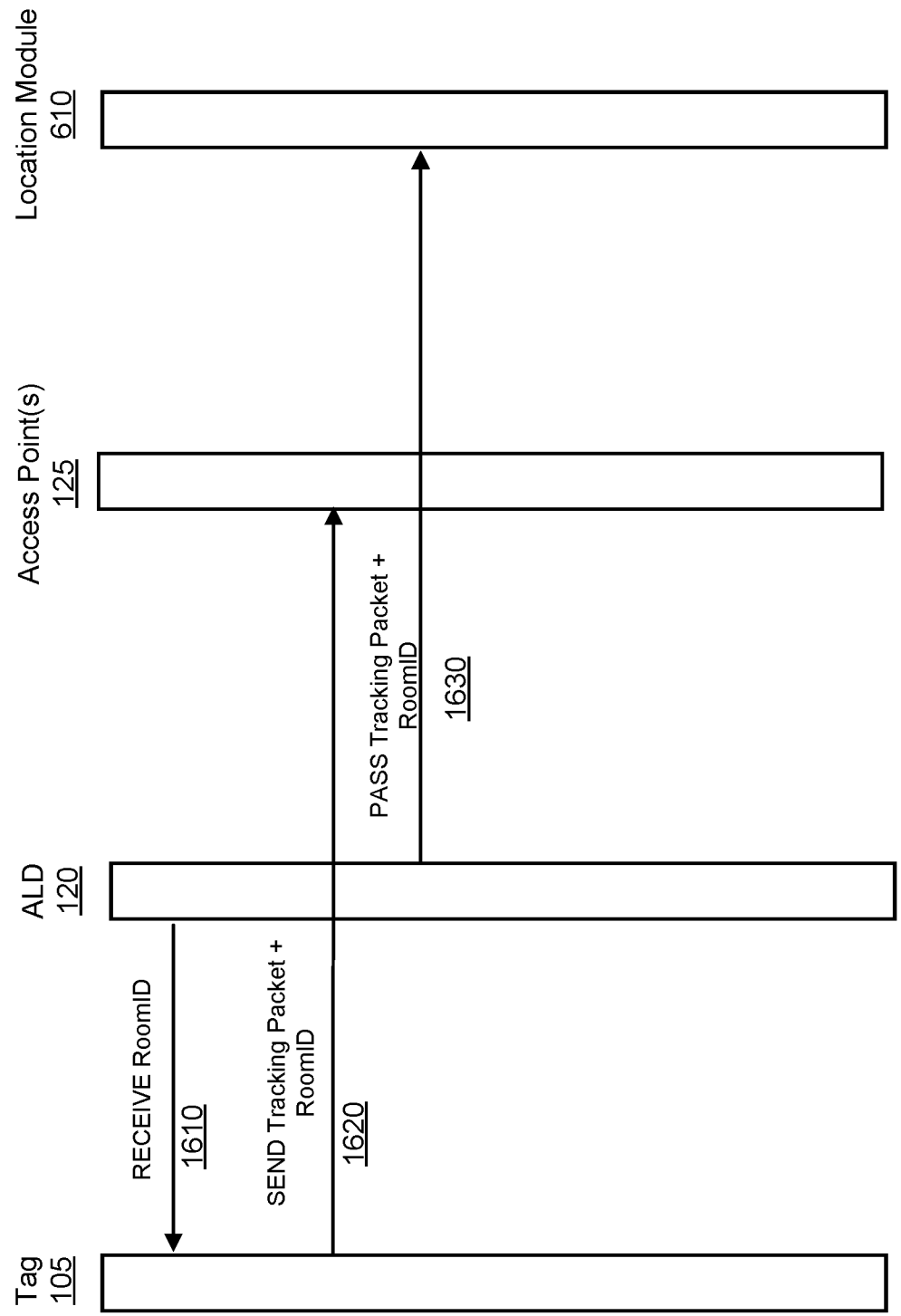
FIG. 16 is an interaction diagram illustrating an example process for localizing a tag using RSSI data and RoomID codes, according to an embodiment.

FIG. 16 is an interaction diagram illustrating an example process for localizing a tag 105 using RSSI data and RoomID codes, according to an embodiment. In order to use RoomID information, a tag 105 can open an IR receiver and receive 1610 a broadcasted RoomID associated with its current room (for example, from an ALD 120 or other IR beacon). Wireless tags 105 can also automatically wake up when an IR receiver receives an IR transmission. When the tag 105 sends 1620 a BLE tracking packet, the recently received RoomID can be included (alongside the MAC of the tag 105 etc.). Access points 125 and gateways can similarly pass 1630 along the RoomID information to the localization system 155. As described above, bandwidth limitations of the IR beacon (such as beacon 300) can mean that the same RoomID is associated with multiple RoomIDs within a tracked space. To resolve these duplicates, the location module 610 determines an approximate of the location of the tag 105 and selects a room ID associated with the RoomID based on the approximate room location (for example, selecting the room associated with the correct RoomID closest to the approximate room location). In some implementations, room fingerprints are used to determine the approximate room location (and the RoomID is used to confirm or override the approximate results). After the lag is localized based on the RoomID, the tag 105 location can be used similar to the process of FIG. 14 (for example, for updating ML models and/or forwarding to the application cloud 150 for further use).

Figure 17:
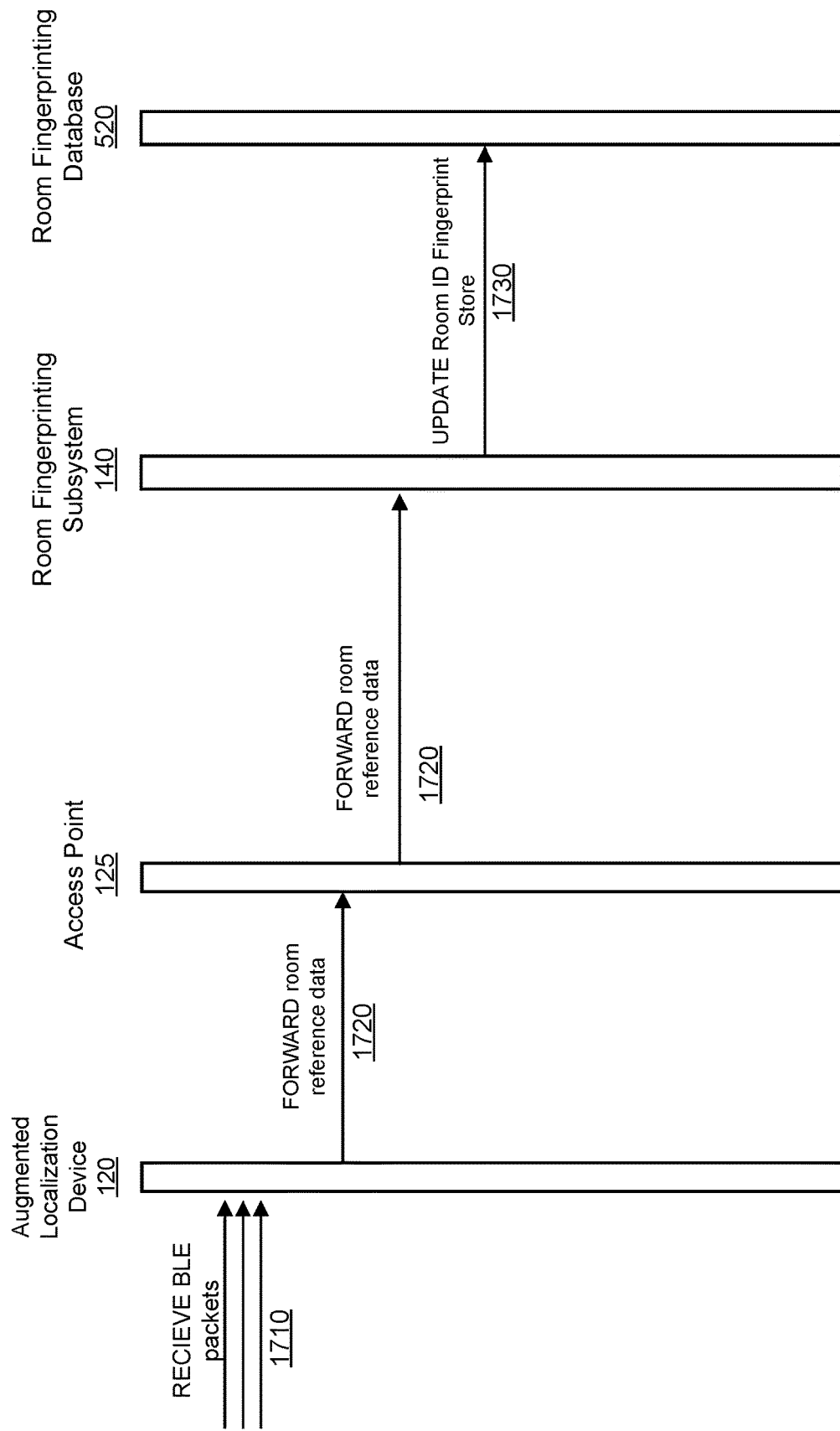
FIG. 17 is an interaction diagram illustrating an example process for implementing an augmented localization device "listening window" for collecting room reference data to train room fingerprints, according to an embodiment.

FIG. 17 is an interaction diagram illustrating an example process for implementing an augmented localization device "listening window" for collecting room reference data to train room fingerprints, according to an embodiment. To collect room reference data, an ALD 120 can periodically open its RF receiver and receive 1710 BLE packets coming from fixed BLE sources (such as other ALDs 120, access points 125, etc.). In some implementations, this occurs for a fixed period each day (for example, one minute). On receiving BLE packets during the listening window, the ALD 120 records RSSI data (for example including an average and standard deviation of the RSSI), a MAC address or other ID of the fixed BLE source, and a time the transmission was captured). The ALD 120 can then forward 1720 this room reference data to the room fingerprinting subsystem 140 (for example, via an access point 125). The room fingerprinting subsystem 140, as described above can use the room reference data to train a ML model and update 1730 a room fingerprint for the room ID associated with the ALD 120. The room fingerprinting database 520 can then be updated with the revised room fingerprint or for the ML model to self-improve.

Figure 18:
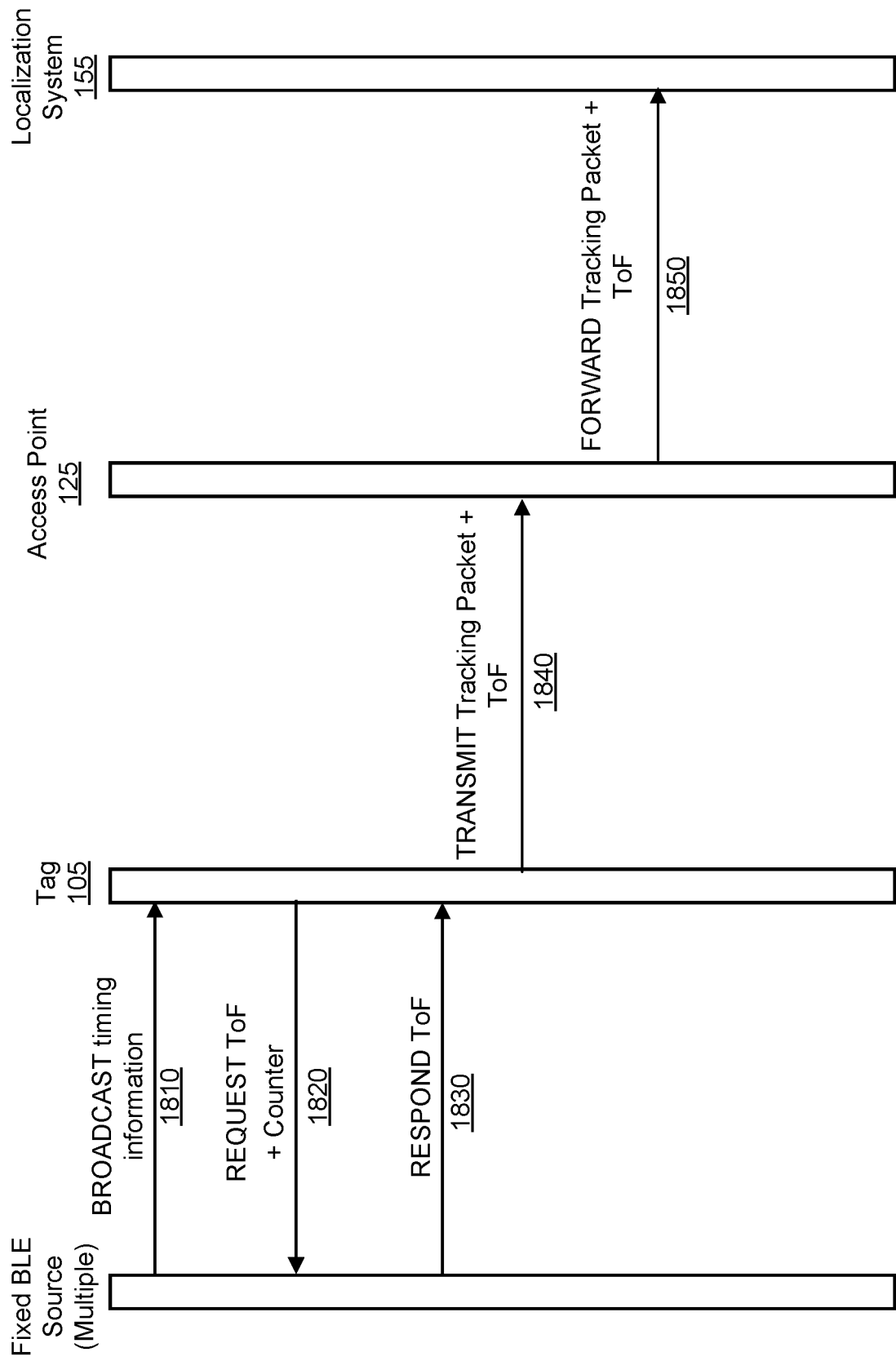
FIG. 18 is an interaction diagram illustrating an example process for localizing a tag using time of flight information between the tag and a fixed BLE source, according to an embodiment.

FIG. 18 is an interaction diagram illustrating an example process for localizing a tag 105 using time of flight information between the tag 105 and a fixed BLE source, according to an embodiment. To get ToF data to a fixed BLE source, a tag 105 can listen for a broadcast from the fixed BLE source, the broadcast 1810 including time information giving an indication of when the BLE source will be listening for requests. The tag 105 can send a request 1820 for ToF during the listening slot, requesting ToF information and including a counter. On receiving the request the fixed BLE source responds 1830 with the ToF information. Time of flight information (for example, an ID of the fixed BLE source and an estimated range to the BLE source) can then be included in tracking packets transmitted 1840 by the tag 105. The ToF information can be forwarded 1850 to the localization system 155 by the access point 125s receiving the tag's 105 tracking packet. The tracking packet may also include an identifier of the fixed BLE source, an identifier of the tag 105, RSSI data, and other tracking information. In some embodiments, the localization system 155 can use the ToF information to improve that accuracy of the predicted location of the tag 105.

Figure 19:
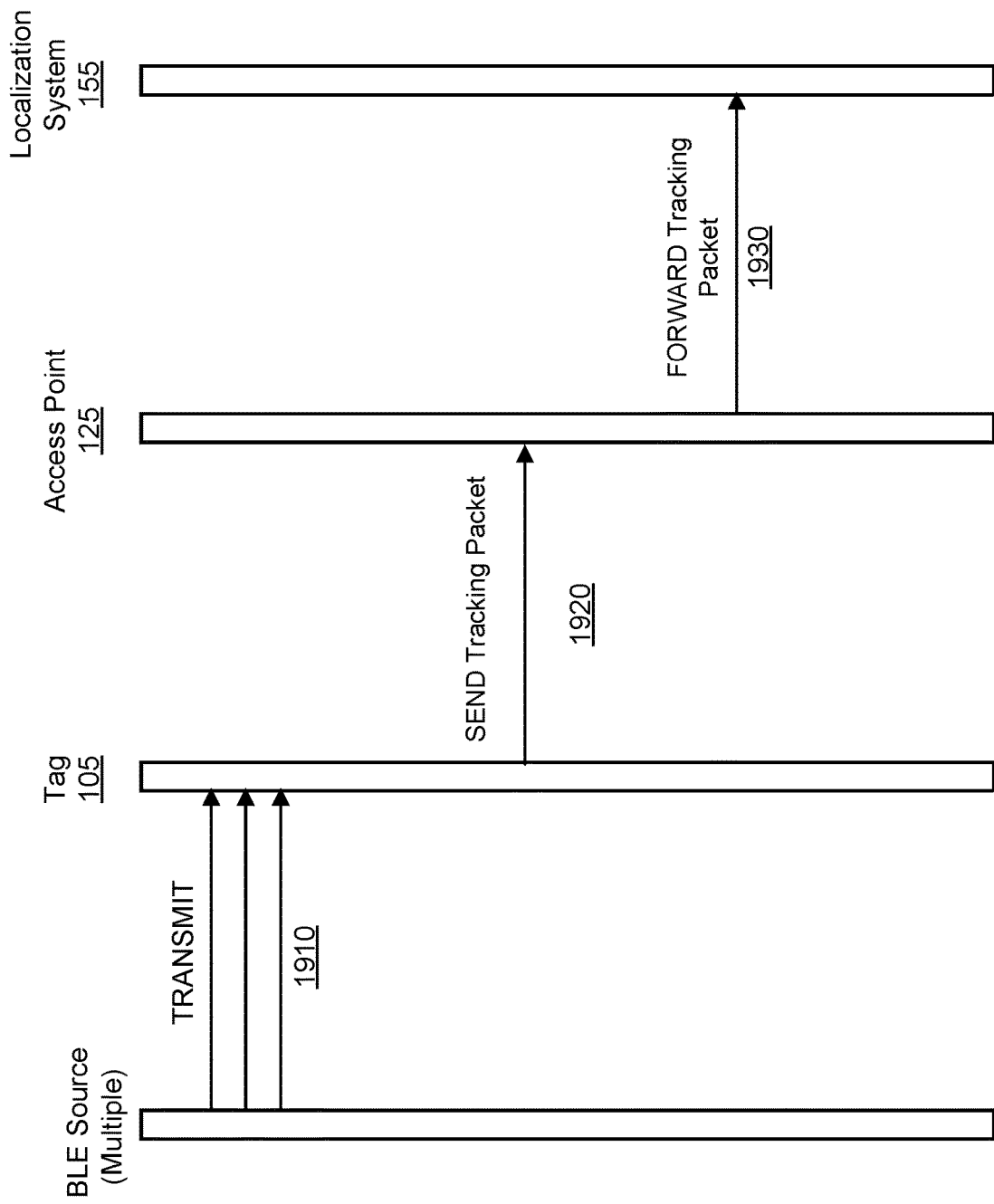
FIG. 19 is an interaction diagram illustrating an example process for gathering RSSI data from nearby BLE sources using a tag, according to an embodiment.

FIG. 19 is an interaction diagram illustrating an example process for gathering RSSI data from nearby BLE sources using a tag 105, according to an embodiment. To determine RSSI information for nearby BLE sources, a tag 105 can listen for broadcasts transmitted 1910 from the fixed BLE sources and record MAC addresses and RSSI information for each received broadcast. This information can then be included in tracking packets sent 1920 by the tag 105 to access points 125 and gateways. The access point 125 can forward 1930 the tag's 105 collected RSSI information to the localization system 155. In some embodiments, the localization system 155 can use the tag 105's collected RSSI information to improve that accuracy of the predicted location of the tag 105.

In an implementation, a localization system 155 receives, from a plurality of access point 125s, tracking information for a tag 105 within a tracked space comprising a set of defined rooms, the tracking information including a plurality instances of tracking data derived from the receipt of a tracking packet at an access point 125, the tracking data including an identifier of the tag 105, RSSI information of the wireless packet received at the access point 125, and a time the tracking packet was received by the access point 125. The localization system 155 can then determine an initial estimate of the location of the tag 105 within the tracked space and request room fingerprints for rooms nearby to the estimated location of the tag 105, the room fingerprints comprising a range of expected RSSI values for a room. Then, based on the room fingerprints, the localization system 155 can perform location calculations (such as a trilateration operation or statistical filtering operation) to determine an improved estimate of the location of the tag 105.

To gather room fingerprint data for a room, an ALD 120 fixed within the room can periodically listen for low energy RF signals from fixed sources outside the room, for example for one minute. The ALD 120 can record telemetry data for each fixed source received during this period, including an identifier of the fixed source, an average and standard deviation of RSSI for the source, and time(s) that transmissions from the source were received (or other statistical data about the reception of the tracking packet). In some implementations, the ALD 120 broadcasts the gathered telemetry information in one or more wireless tracking packets over the low energy RF network. One or more access points 125 in the space can receive the tracking packets and relay the telemetry information to the localization system 155 for use in determining a fingerprint for the room. Based on the telemetry information, the localization system 155 trains or updates a machine learning model that generates a room fingerprint for the room to improve the machine learning model. The generated room fingerprint can be stored for later use in localization.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method of determining the location of one or more wireless tags comprising:

receiving, for each room of a plurality of rooms, occupancy data of the room from an occupancy sensor in the room, wherein the occupancy data of each room was determined by:
- determining a heat signature of the room from a thermal camera; and
- determining an occupancy of the room based on the heat signature of the room;

receiving location data of one or more wireless tags, wherein the location data for each wireless tag comprises a corresponding tracking packet generated by the wireless tag that includes one or more RoomIDs that were detected by the wireless tag from signals transmitted by one or more augmented localization devices associated with corresponding ones of the plurality of rooms, the location data of each wireless tag indicating one or more probabilities that the wireless tag is in at least some of the plurality of rooms; and determining, based on the location data and the occupancy data, which room of the plurality of rooms each wireless tag of the one or more wireless tags is located.

2. The method of claim 1, wherein each wireless tag is associated with an object detectable by its heat signature.

3. The method of claim 1, wherein a probability that the wireless tag is in a given room of the plurality of rooms is determined based on a signal strength of a signal transmitted by the wireless tag detected by a receiver associated with the given room.

4. The method of claim 1, wherein at least some of the wireless tags are wearable by a human.

5. The method of claim 1, wherein at least some of the wireless tags periodically broadcast tracking packets comprising location data.

6. The method of claim 1, wherein a wireless tag of the one or more wireless tags broadcasts the corresponding tracking packet responsive to detecting motion of the wireless tag.

7. The method of claim 1, wherein the location data further comprises motion sensor data.

8. The method of claim 1, wherein the corresponding tracking packet of a wireless tag of the wireless tags further comprises Received Signal Strength Indication (RSSI) data indicating one or more signal strengths of the signals transmitted by the one or more augmented localization devices, and the one or more probabilities are determined from the RSSI data.

9. The method of claim 1, wherein the corresponding tracking packet of a wireless tag of the wireless tags further comprises Time of Flight data indicating an amount of time between when the signals transmitted by the one or more augmented localization devices were transmitted and received, and the one or more probabilities are determined from the Time of Flight data.

10. A non-transitory computer readable medium storing instructions that, when executed by a processor, cause the processor to perform steps comprising:

receiving, for each room of a plurality of rooms, occupancy data of a room from an occupancy sensor in a room, wherein the occupancy data of each room was determined by:
- determining a heat signature of the room from a thermal camera; and
- determining an occupancy of the room based on the heat signature of the room;

receiving location data of one or more wireless tags, wherein the location data for each wireless tag comprises a corresponding tracking packet generated by the wireless tag that includes one or more RoomIDs that were detected by the wireless tag from signals transmitted by one or more augmented localization devices associated with corresponding ones of the plurality of rooms; and determining, based on the location data and the occupancy, which room of the plurality of rooms each wireless tag of the one or more wireless tags is located.

11. The non-transitory computer readable medium of claim 10, wherein each wireless tag is associated with an object detectable by its heat signature.

12. The non-transitory computer readable medium of claim 10, wherein a probability that the wireless tag is in a given room of the plurality of rooms is determined based on a signal strength of a signal transmitted by the wireless tag detected by a receiver associated with the given room.

13. The non-transitory computer readable medium of claim 10, wherein at least some of the wireless tags are wearable by a human.

14. The non-transitory computer readable medium of claim 10, wherein at least some of the wireless tags periodically broadcast tracking packets comprising location data.

15. The non-transitory computer readable medium of claim 10, wherein a wireless tag of the one or more wireless tags broadcasts the corresponding tracking packet responsive to detecting motion of the wireless tag.

16. The non-transitory computer readable medium of claim 10, wherein the location data further comprises motion sensor data.

17. The non-transitory computer readable medium of claim 10, wherein the corresponding tracking packet of a wireless tag of the wireless tags further comprises Received Signal Strength Indication (RSSI) data indicating one or more signal strengths of the signals transmitted by the one or more augmented localization devices, and the one or more probabilities are determined from the RSSI data.

18. The non-transitory computer readable medium of claim 10, wherein the corresponding tracking packet of a wireless tag of the wireless tags further comprises Time of Flight data indicating an amount of time between when the signals transmitted by the one or more augmented localization devices were transmitted and received, and the one or more probabilities are determined from the Time of Flight data.

* * * * *